(12) United States Patent
Jeong

(10) Patent No.: US 12,535,916 B2
(45) Date of Patent: Jan. 27, 2026

(54) DISPLAY DEVICE AND METHOD OF DRIVING THE SAME, AND ELECTRONIC DEVICE INCLUDING DISPLAY DEVICE

(71) Applicant: Samsung Display Co., Ltd., Yongin-Si (KR)

(72) Inventor: Joo Hyeon Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/667,373

(22) Filed: May 17, 2024

(65) Prior Publication Data
US 2025/0044899 A1    Feb. 6, 2025

(30) Foreign Application Priority Data

Aug. 2, 2023    (KR) .................. 10-2023-0101282

(51) Int. Cl.
G06F 3/041    (2006.01)
G06F 3/042    (2006.01)
G06F 3/044    (2006.01)
G06V 40/13    (2022.01)

(52) U.S. Cl.
CPC ...... *G06F 3/04186* (2019.05); *G06F 3/04166* (2019.05); *G06F 3/042* (2013.01); *G06F 3/0446* (2019.05); *G06V 40/1318* (2022.01); G06F 2203/04106 (2013.01)

(58) Field of Classification Search
CPC ....... G06F 2203/04106; G06F 3/04166; G06F 3/04186; G06F 3/042; G06F 3/0446; G06V 40/1318
See application file for complete search history.

(56) References Cited

U.S. PATENT DOCUMENTS

| | | | |
|---|---|---|---|
| 9,946,421 B2 | 4/2018 | Kang et al. | |
| 11,023,066 B2 | 6/2021 | Kim | |
| 11,501,556 B2 | 11/2022 | Jang et al. | |
| 2019/0163313 A1* | 5/2019 | Kim | G06F 3/0412 |
| 2020/0218871 A1* | 7/2020 | Jhang | G06V 10/147 |
| 2021/0357610 A1* | 11/2021 | Bu | G06V 40/1318 |
| 2023/0131015 A1* | 4/2023 | Li | G06F 3/0446 |
| | | | 345/173 |

FOREIGN PATENT DOCUMENTS

| | | |
|---|---|---|
| KR | 10-20180012482 A | 2/2018 |
| KR | 10-20180061482 A | 6/2018 |
| KR | 10-2396711 B1 | 5/2022 |
| KR | 10-2475424 B1 | 12/2022 |
| WO | 2018021721 A1 | 2/2018 |

* cited by examiner

*Primary Examiner* — Robin J Mishler
(74) *Attorney, Agent, or Firm* — Innovation Counsel LLP

(57) ABSTRACT

Provided herein may be a display device including: a display component comprising pixels and photo sensors; a sensor component provided to at least partially overlap the display component, and including sensors; a first sensor driver configured to drive the sensor component, sense a touch of an object, and generate detection data; a second sensor driver configured to drive the photo sensors, sense the touch of the object during a first sensing section, sense a fingerprint of a user during a second sensing section, and generate sensing data; and a processor configured to determine whether the touch of the object is present using the detection data and the sensing data.

20 Claims, 13 Drawing Sheets

P_SC: P_SC1, P_SC2

P_SC: P_SC1, P_SC2

P_SC: P_SC1, P_SC2

DISPLAY DEVICE AND METHOD OF DRIVING THE SAME, AND ELECTRONIC DEVICE INCLUDING DISPLAY DEVICE

CROSS-REFERENCE TO RELATED APPLICATION

The present application claims priority to Korean patent application number 10-2023-0101282 filed on Aug. 2, 2023, the entire disclosure of which is incorporated herein in its entirety by reference.

BACKGROUND

Field

Various embodiments of the present disclosure relate to a display device, a method of driving the display device, and an electronic device including the display device.

Description of Related Art

With advancement in information-oriented societies, requirements for display devices configured to display an image have increased in various types. For example, display devices have been applied to various electronic devices such as smartphones, digital cameras, notebook computers, navigation devices, and smart televisions.

Display panels may include a sensor component configured to sense a touch position, and a display component configured to display an image.

In the sensor component, ghost touches, which are unintended by the user, can be sensed.

SUMMARY

Various embodiments of the present disclosure are directed to a display device capable of sensing input from a user other than ghost touches, and a method of driving the display device, and an electronic device including the display device.

An embodiment of the present disclosure may provide a display device, including: a display component; a sensor component; a first sensor driver; a second sensor driver; and a processor. The display component comprises pixels and photo sensors. The sensor component is provided to at least partially overlap the display component, and includes sensors. The first sensor driver is configured to drive the sensor component, sense a touch of an object, and generate detection data. The second sensor driver is configured to drive the photo sensors, sense the touch of the object during a first sensing section, sense a fingerprint of a user during a second sensing section, and generate sensing data. The processor is configured to determine whether the touch of the object is present using the detection data and the sensing data.

In an embodiment, the processor may determine that the object has been touched for real in a case where both the first sensor driver and the second sensor driver determine that the touch of the object is present.

In an embodiment, the processor may determine the object as having not been touched in a case where either the first sensor driver or the second sensor driver determines that the touch of the object is not present.

In an embodiment, the processor may primarily determine the touch of the object using the detection data, and secondarily determine the touch of the object using the sensing data.

In an embodiment, the second sensor driver may supply the sensing data to the first sensor driver in a case where the object is touched in a specific area of the display component. The first sensor driver may suspend baseline tracking in a case where the sensing data is inputted.

In an embodiment, the first sensor driver may detect whether the touch of the object is present in the specific area after suspending the baseline tracking.

In an embodiment, the specific area may be a proximity touch area.

In an embodiment, the first sensor driver and the second sensor driver may be connected by a communication line.

In an embodiment, the first sensing section and the second sensing section may be included in one frame period.

In an embodiment, the first sensing section may be included in a first frame period, and the second sensing section may be included in a second frame period adjacent to the first frame period.

An embodiment of the present disclosure may provide a method of driving a display device, including: sensing a touch of an object using touch sensors; sensing a fingerprint and the touch of the object by driving photo sensors in a time-sharing manner; and determining the touch of the object as a real touch in a case where the touch of the object is sensed in both the touch sensors and the photo-sensors.

In an embodiment, the fingerprint may be sensed by the photo sensors at least one time during one frame period, and the touch of the object may be sensed by the photo sensors at least one time during the one frame period.

In an embodiment, in a case where the touch of the object is not sensed by either the touch sensors or the photo sensors, the object may be determined as having not been touched.

In an embodiment, the method may further include, in a case where the touch of the object is sensed by the photo sensors, suspending baseline tracking, and then sensing the touch of the object using the touch sensors.

In an embodiment, a first sensor driver configured to drive the touch sensors and a second sensor driver configured to drive the photo sensors may communicate with each other through a communication line.

In an embodiment, the photo sensors may sense the fingerprint during a first frame period, and sense the touch of the object during a second frame period adjacent to the first frame period.

An embodiment of the present disclosure may provide an electronic device including: a display panel; a first sensor; a second sensor driver; and an application processor. The display panel comprises a display component including pixels and photo sensors, and a sensor component configured to at least partially overlap the display component and including sensors. The first sensor driver is configured to drive the sensor component, sense a touch of an object, and generate detection data. The second sensor driver is configured to drive the photo sensors, sense the touch of the object during a first sensing section, sense a fingerprint of a user during a second sensing section, and generate sensing data. The application processor is configured to determine whether the touch of the object is present using the detection data and the sensing data.

In an embodiment, the application processor may determine that the object has been touched for real in a case where an input from the object is sensed by both the first sensor driver and the second sensor driver.

In an embodiment, the second sensor driver may supply the sensing data to the first sensor driver in a case where the object is touched in a specific area of the display component. In a case where the sensing data is inputted, the first sensor driver may suspend the baseline tracking and then detect whether the touch of the object is present in the specific area.

In an embodiment, the first sensor driver and the second sensor driver may be connected by a communication line.

The features of the present disclosure are not limited to the above-stated features, and those skilled in the art will clearly understand other not mentioned features from the accompanying claims.

DETAILED DESCRIPTION

Figure 1:
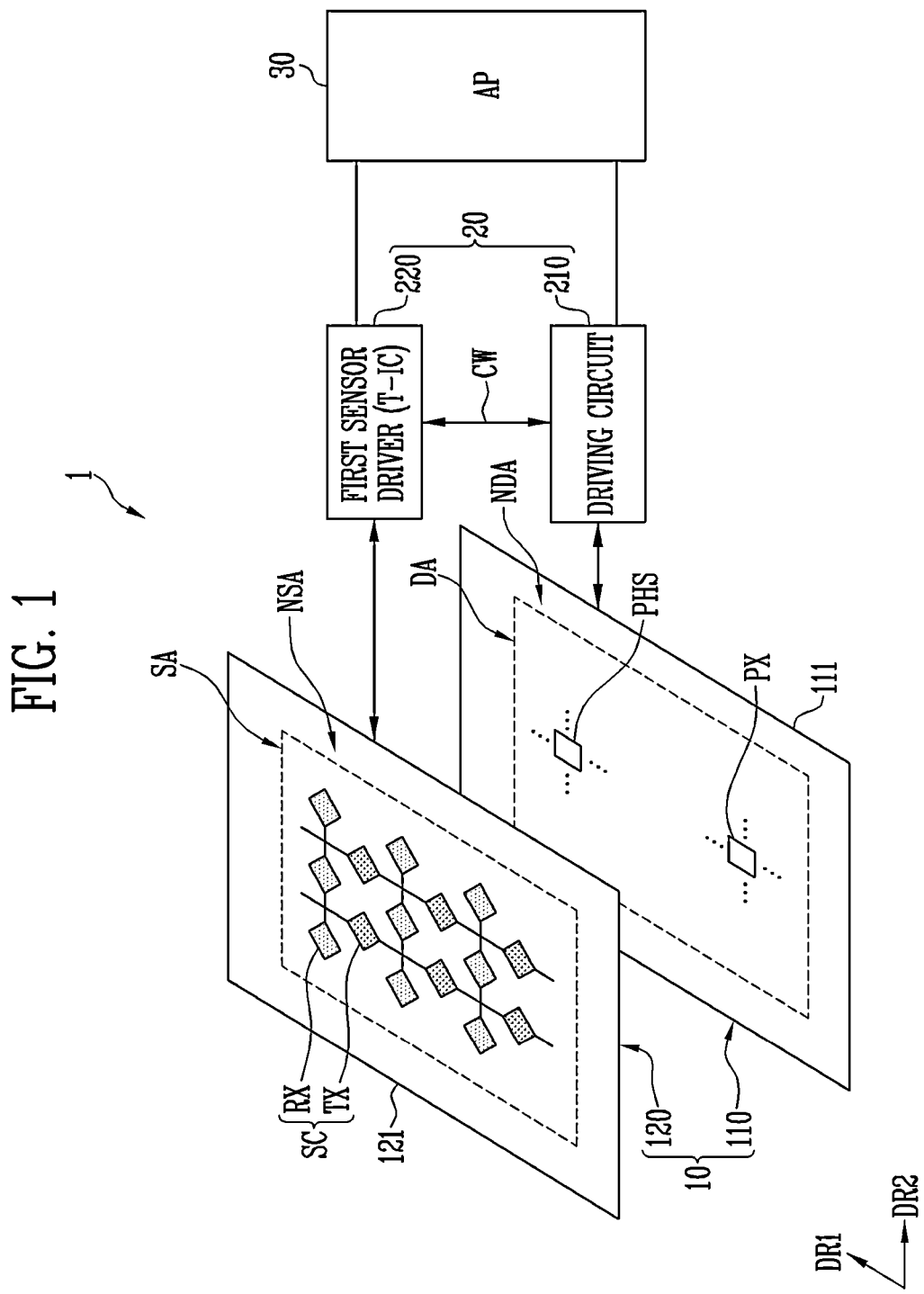
FIG. 1 is a diagram illustrating a display device in accordance with an embodiment of the present disclosure.

Hereinafter, embodiments will be described in detail with reference to the attached drawings, such that those skilled in the art can easily implement the inventive concept. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which the term "substantially" has been omitted.

Some embodiments are described in the accompanying drawings in connection with functional blocks, units and/or modules. Those skilled in the art will understand that such blocks, units, and/or modules are physically implemented by logic circuits, discrete components, microprocessors, hard-wired circuits, memory elements, line connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g. one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

The term "connection" between two components may embrace electrical connection and physical connection, but the present disclosure is not limited thereto. For example, the term "connection" used in description with reference to a circuit diagram may refer to electrical connection, and the term "connection" used in description with reference to a sectional view or a plan view may refer to physical connection.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure.

However, the present disclosure is not limited to the following embodiments and may be modified into various forms. Each embodiment to be described below may be implemented alone, or combined with at least another embodiment to make various combinations of embodiments.

Figure 2:
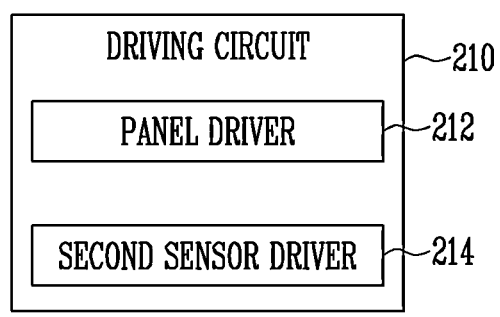
FIG. 2 is a diagram illustrating an example of a driving circuit shown in FIG. 1.

FIG. 1 is a diagram illustrating a display device 1 in accordance with an embodiment of the present disclosure. FIG. 2 is a diagram illustrating an example of a driving circuit 210 shown in FIG. 1.

Referring to FIG. 1, the display device 1 may be employed in electronic devices such as a computer, a laptop, a cellular phone, a smart phone, a personal digital assistants (PDA), a potable multimedia player (PMP), a digital TV, a digital camera, a potable game console, a navigation device, a wearable device, an internet of tings (IoT) device, an internet of everything (IoE) device, an e-book, a virtual reality (VR) device, an augmented reality (AR) device, a navigation device for vehicles, a videophone, a monitoring system, an automatic focus system, a tracking system, and a motion sensor system.

The display device 1 may include a panel 10, and a driving circuit component 20 configured to drive the panel 10. Furthermore, display device 1 may further include an application processor 30, or may be connected to the application processor 30.

The panel 10 may include a display component 110 (or a display panel), and a sensor component 120 (or a sensor panel). The display component 110 may display an image, and sense touch input (e.g., fingerprint sensing). The sensor component 120 may sense (or detect) external input such as a touch, pressure, a fingerprint, and hovering. For example, the panel 10 may include pixels PX, photo sensors PHS, and sensors SC (or touch sensors) positioned to overlap at least some of the pixels PX and the photo sensors PHS. In an embodiment, the sensors SC may include first sensors TX (or driving electrodes) and second sensors RX (or sensing electrodes). In an embodiment (e.g., in a self-capacitance scheme), the sensors SC may be formed of one type of sensors regardless of whether the sensors SC are the first or second sensors TX or RX.

The driving circuit component 20 may include the driving circuit 210 configured to drive the display component 110, and a first sensor driver 220 configured to drive the sensor component 120. For example, the pixels PX may display an image during each display frame period. For example, the sensors SC may sense input from a user during each sensing frame period. The sensing frame period and the display frame period may be independent from each other, and be different from each other. The sensing frame period and the display frame period may be synchronized with each other, or may not be synchronized.

In an embodiment, the display component 110 and the sensor component 120 may be separately fabricated, and may then be disposed and/or connected with each other such that at least respective portions thereof overlap each other. In an embodiment, the display component 110 and the sensor component 120 may be integrally fabricated. For example, the sensor component 120 may be directly formed on at least one substrate (e.g., an upper and/or lower substrate of the display panel, or a thin film encapsulation layer) that forms the display component 110, or other insulating layers or various functional layers (e.g., an optical layer or a passivation layer).

Although FIG. 1 illustrates that the sensor component 120 is disposed on a front surface of the display component 110 (e.g., an upper surface, on which an image is displayed), the position of the sensor component 120 is not limited thereto. For example, the sensor component 120 may be disposed on a rear surface or on opposite surfaces of the display component 110. In an embodiment, the sensor component 120 may be disposed on a peripheral area of at least one side of the display component 110.

The display component 110 may include a display substrate 111, and the plurality of pixels PX and the photo sensors PHS that are formed on the display substrate 111. The pixels PX may be disposed in a display area DA of the display substrate 111. The photo sensors PHS may be disposed in a display area DA of the display substrate 111.

The display substrate 111 may include the display area DA formed to display an image, and a non-display area NDA provided around the periphery of the display area DA. In an embodiment, the display area DA may be disposed in a central area of the display component 110, and the non-display area NDA may be disposed in the peripheral area of the display component 110 to enclose the display area DA.

The display substrate 111 may be a rigid substrate or a flexible substrate, and the material or properties thereof are not particularly limited. For example, the display substrate 111 may be a rigid substrate made of glass or reinforced glass, or a flexible substrate formed of a thin film made of plastic or metal.

The pixels PX may be disposed in the display area DA. The pixels PX may display a certain image corresponding to a data signal. In the present disclosure, the structure of the pixels PX and the method of driving the pixels PX are not particularly limited. For example, each of the pixels PX may be implemented as a pixel that can employ various known structures and driving methods.

The photo sensors PHS may be included in the display area DA. The photo sensor PHS may be referred to as a sensor pixel. The photo sensors PHS may include a light receiving element including a light receiving layer. The light receiving layer of the light receiving element in the display area DA may be disposed at a position spaced apart from the emission layer of the light emitting element.

In an embodiment, a plurality of photo sensors PHS may be distributed to be spaced apart from each other in the overall area of the display area DA. However, the aforementioned example is illustrative, and photo sensors PHS may also be included in at least portion of the non-display area NDA.

In an embodiment, the photo sensors PHS may sense light emitted from a light source (e.g., light emitting elements of the pixels PX) and reflected by an external object (e.g., a finger of the user). For example, the fingerprint of the user may be sensed by the photo sensors PHS. For example, a touch from the user may be sensed by the photo sensors PHS. Although hereinafter the photo sensors PHS will be described as being used for fingerprint sensing and touch sensing by way of example, the photo sensors PHS may sense various types of biometric information such as iris information or vein information, in various embodiments.

Various lines and/or an internal circuit component that are connected to the pixels PX and/or the photo sensors PHS in the display area DA may be disposed in the non-display area NDA. For example, a plurality of lines for supplying various power and control signals to the display area DA may be disposed in the non-display area NDA. In addition, the scan driver and the like may also be disposed in the non-display area NDA.

In the present disclosure, the type of the display component 110 is not particularly limited. For example, the display component 110 may be implemented as a self-emissive-type display panel such as an organic light emitting display panel. However, in the case where the display component 110 is implemented as a self-emissive type, the present disclosure is not limited to the case where each of the pixels PX includes only an organic light emitting element. For example, the light emitting element of each of the pixels PX may be formed of an organic light emitting diode, an inorganic light emitting diode, a quantum dot/well light emitting diode, or the like. In an embodiment, a plurality of light emitting elements may be provided in each of the pixels PX. Here, the plurality of light emitting elements may be connected in series, parallel, or series-parallel to each other. Alternatively, the display component 110 may be implemented as a non-emission type display panel such as a liquid crystal display panel. In the case in which the display component 110 is implemented as a non-emission type, the display device 1 may further include a light source such as a back-light unit.

The sensor component 120 may include a sensor substrate 121, and the plurality of sensors SC formed on the sensor substrate 121. The sensors SC may be disposed in a sensing area SA on the sensor substrate 121.

The sensor substrate 121 may include the sensing area SA capable of sensing touch input or the like, and a peripheral area NSA formed around the periphery of the sensing area SA. In an embodiment, the sensing area SA may be disposed to overlap at least one area of the display area DA. For example, the sensing area SA may be set to an area corresponding to the display area DA (e.g., an area overlapping the display area DA). The peripheral area NSA may be set to an area corresponding to the non-display area NDA (e.g., an area overlapping the non-display area NDA). In this case, when touch input or the like is provided on the display area DA, the sensor component 120 may detect the touch input.

The sensor substrate 121 may be a rigid or flexible substrate, and may be formed of at least one insulating layer. Furthermore, the sensor substrate 121 may be a transparent or translucent light-transmissive substrate, but is not limited thereto. In other words, in the present disclosure, the material or properties of the sensor substrate 121 are not particularly limited. Furthermore, in an embodiment, at least one substrate (e.g., the display substrate 111, an encapsulation substrate and/or a thin film encapsulation layer) that forms the display component 110, or at least one insulating layer, functional layer, or the like that is disposed inside the display component 110 and/or on an outer surface of the display component 110 may be used as the sensor substrate 121.

The sensing area SA may be set to an area (i.e., an active area of the sensor) capable of responding to touch input. To this end, the sensors SC for sensing touch input or the like may be disposed in the sensing area SA. In an embodiment, the sensors SC may include the first sensors TX and the second sensors RX.

For example, each of the first sensors TX may extend in a first direction DR1. The first sensors TX may be arranged in the second direction DR2. A second direction DR2 may differ from the first direction DR1. For example, the second direction DR2 may be a direction perpendicular to the first direction DR1. In an embodiment, the extension direction and the arrangement direction of the first sensors TX may correspond to conventional configurations. Each of the first sensors TX may have a structure in which first cells each having a relatively large surface area and first bridges each having a relatively small surface area are connected to each other. Although FIG. 1 illustrates the case in which each of the first cells has a diamond form, the first cells may have various typical forms such as a circular form, a rectangular form, a triangular form, and a mesh form. For example, the first bridges may be integrally formed with the first cells on the same layer. In an embodiment, the first bridges may be formed in a layer different from a layer in which the first cells are formed, and may electrically connect the adjacent first cells to each other.

For example, each of the second sensors RX may extend in the second direction DR2. The second sensors RX may be arranged in the first direction DR1. In an embodiment, the extension direction and the arrangement direction of the second sensors RX may correspond to conventional configurations. Each of the second sensors RX may have a shape in which second cells each having a relatively large surface area and second bridges each having a relatively small surface area are connected to each other. Although FIG. 1 illustrates that each of the second cells has a diamond form, the second cells may have various typical forms such as a circular form, a rectangular form, a triangular form, and a mesh form. For example, the second bridges may be integrally formed with the second cells in the same layer. In an embodiment, the second bridges may be formed on a layer different from a layer in which the second cells are formed, and may electrically connect the adjacent second cells to each other.

In an embodiment, each of the first sensors TX and the second sensors RX may include at least one of metal, a transparent conductive material, and various other conductive materials, and may thus be electrically conductive. For example, the first sensor TX and the second sensors RX may include at least one of various metals including gold (Au), silver (Ag), aluminum (Al), molybdenum (Mo), chrome (Cr), titanium (Ti), nickel (Ni), neodymium (Nd), copper (Cu), platinum (Pt), and the like, or an alloy thereof. Here, the first sensors TX and the second sensors RX may have a mesh form. Furthermore, the first sensor TX and the second sensors RX may include at least one of various transparent conductive materials including a silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO$_2$), carbon nanotubes, and graphene. In addition, the first sensors TX and the second sensors RX may include at least one of various conductive materials, and may thus be electrically conductive. Furthermore, each of the first sensors TX and the second sensors RX may have a single-layer structure or a multi-layer structure, and the cross-sectional structure thereof is not particularly limited.

In the peripheral area NSA of the sensor component 120, sensor lines may be intensively disposed to electrically connect the first and second sensors TX and RX to the first sensor driver 220 or the like.

The driving circuit component 20 may include the driving circuit 210 configured to drive the display component 110, and the first sensor driver 220 configured to drive the sensor component 120. In an embodiment, the first sensor driver 220 may be implemented as an integrated circuit (IC) (e.g., a sensor integrated circuit (T-IC)).

The first sensor driver 220 may be electrically connected to the sensor component 120, and may drive the sensor component 120. The first sensor driver 220 may include a sensor transmitter and a sensor receiver. In an embodiment, the sensor transmitter and the sensor receiver may be integrated into one IC, but the present disclosure is not limited thereto.

In embodiments, the first sensor driver 220 may periodically set/update offset data (or a base line) corresponding to a state of no input from an object to accurately determine input from the object, and may reflect the offset data in a sensing signal to sense the input from the object.

As shown in FIG. 2, the driving circuit 210 may include a panel driver 212 and a second sensor driver 214. The panel driver 212 and the second sensor driver 214 may be implemented as integrated circuits independent from each other, or may be implemented as a single integrated circuit. For instance, at least a portion of the second senor driver 214 may be included in the panel driver 212 or be interlocked with the panel driver 212.

The panel driver 212 may scan the pixels PX in the display area DA, and supply a data signal corresponding to image data (or an image) to the pixels PX. The display component 110 may display an image corresponding to the data signal.

For example, the panel driver 212 may provide data signals to the pixels PX. In an embodiment, the panel driver 212 may include a data driver and a timing controller. The scan driver may be separately mounted in the non-display area NDA of the display component 110. In an embodiment, the panel driver 212 may include all or at least some of the data driver, the timing controller, and the scan driver.

In an embodiment, the panel driver 212 may supply a driving signal for light sensing (e.g., fingerprint sensing) to the pixels PX. The driving signal may be provided to cause the pixels PX to emit light and operate as a light source for the photo sensors PHS. In an embodiment, the panel driver 212 may also supply the driving signal and/or another driving signal for light sensing to the photo sensors PHS. However, the aforementioned example is only for illustrative purposes, and driving signals for light sensing may be provided by the second sensor driver 214.

The second sensor driver 214 may detect biometric information related to the fingerprint of the user or the like, based on sensing signals received from the photo sensors PHS. In addition, the second sensor driver 214 may detect a touch from the user, based on sensing signals received from the photo sensors PHS.

In an embodiment of the present disclosure, the first sensor driver 220 and the driving circuit 210 may be electrically connected to each other. For example, the first sensor driver 220 and the driving circuit 210 may be connected to each other by a communication line CW. For example, the first sensor driver 220 and the driving circuit 210 may be connected by an inter-integrated circuit (I2C), a serial peripheral interface (SPI), or the like, to exchange signals (e.g., commands or data) therebetween.

For example, the first sensor driver 220 may primarily sense input (or a touch) from the user, and the driving circuit 210 (or the second sensor driver 214) may secondarily sense input from the user. Here, it can be determined that a touch (or real touch) has occurred at the coordinates determined as the input from the user through the primary sensing and the secondary sensing.

The application processor 30 is electrically connected to the driving circuit 210, and may provide grayscale values and timing signals with regard to a display frame period to the driving circuit 210. Furthermore, the application processor 30 is electrically connected to the first sensor driver 220, and may receive a sensing signal from the first sensor driver 220 or receive input information (e.g., input from the object and a position thereof).

The application processor 30 may correspond to at least one of a graphics processing unit (GPU), a central processing unit (CPU), an application processor (AP), and the like.

Figure 3:
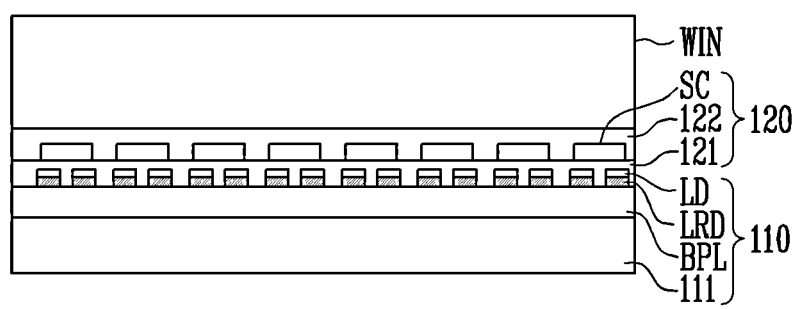
FIG. 3 is a sectional view illustrating an embodiment of the display device of FIG. 1.

FIG. 3 is a sectional view illustrating an embodiment of the display device of FIG. 1.

Referring to FIGS. 1 and 3, the sensor component 120 may be placed over the display component 110. In an embodiment, a window WIN may be placed over the sensor component 120.

The display component 110 may include a display substrate 111, a circuit element layer BPL formed on the display substrate 111, and light receiving elements LRD and light emitting elements LD formed on the circuit element layer BPL. In an embodiment, the circuit element layer BPL may include pixel circuits (e.g., a transistor and a capacitor), scan lines, data lines, and the like to drive the light emitting elements LD of the pixels PX. In an embodiment, the circuit element layer BPL may include circuit elements (e.g., a transistor), sensing scan lines, reset control lines, lead-out lines, and the like to drive the photo sensors PHS.

In an embodiment, the light receiving elements LRD and the light emitting elements LD may be formed in different layers. In an embodiment, the light receiving elements LRD and the light emitting elements LD may be formed in the same layer at positions spaced apart from each other. In FIG. 3, for the sake of convenience in explanation, the light emitting elements LD are illustrated as being positioned over the light receiving elements LRD.

The sensor component 120 may include the sensor substrate 121, the sensors SC formed on the sensor substrate 121, and a protective layer 122 provided to cover the sensors SC. In FIG. 3, there is illustrated an embodiment in which the sensor substrate 121 is provided in the form of an encapsulation layer configured to cover the pixels PX. In an embodiment, the sensor substrate 121 may be provided separately from the encapsulation layer that covers the pixels PX.

The window WIN may be a protective component which is disposed on the uppermost surface of a module of the display device 1, and may be a substantially transparent light-transmissive substrate. The window WIN may have a multilayer structure including at least one selected from among a glass substrate, a plastic film, and a plastic substrate. The window WIN may include a rigid or flexible substrate, and the constituent material of the window WIN is not particularly limited.

Although not illustrated, the display device 1 may further include, between the window WIN and the sensor component 120, a polarizing plate (or a different type of reflection prevention layer) for prevention of external light reflection.

Figure 4:
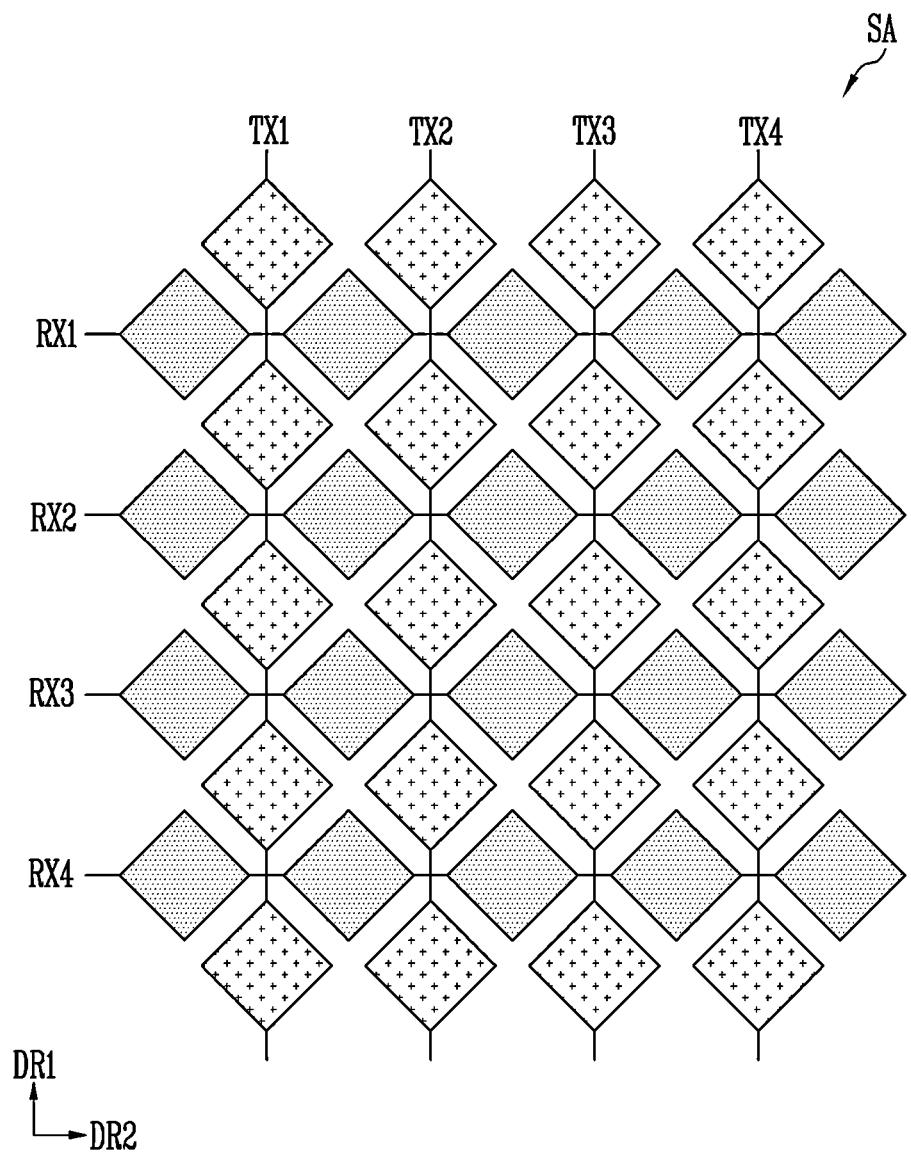
FIG. 4 is a diagram illustrating an embodiment of sensors included in the display device of FIG. 1.

FIG. 4 is a view illustrating an embodiment of sensors included in the display device 1 of FIG. 1.

Referring to FIGS. 1 to 4, there are illustrated first sensors TX1, TX2, TX3, and TX4 and second sensors RX1, RX2, RX3, and RX4 which are positioned in the sensing area SA. For convenience of explanation, it is assumed that four first sensors TX1 to TX4 and four second sensors RX1 to RX4 are disposed in the sensing area SA. Actually, several tens to several hundreds of first and second sensors TX and RX may be disposed in the display device 1.

Descriptions of the first sensors TX1 to TX4 and the second sensors RX1 to RX4 are the same as that of the first sensors TX and the second sensors RX of FIG. 1; therefore, redundant explanation thereof will be omitted.

Figure 5:
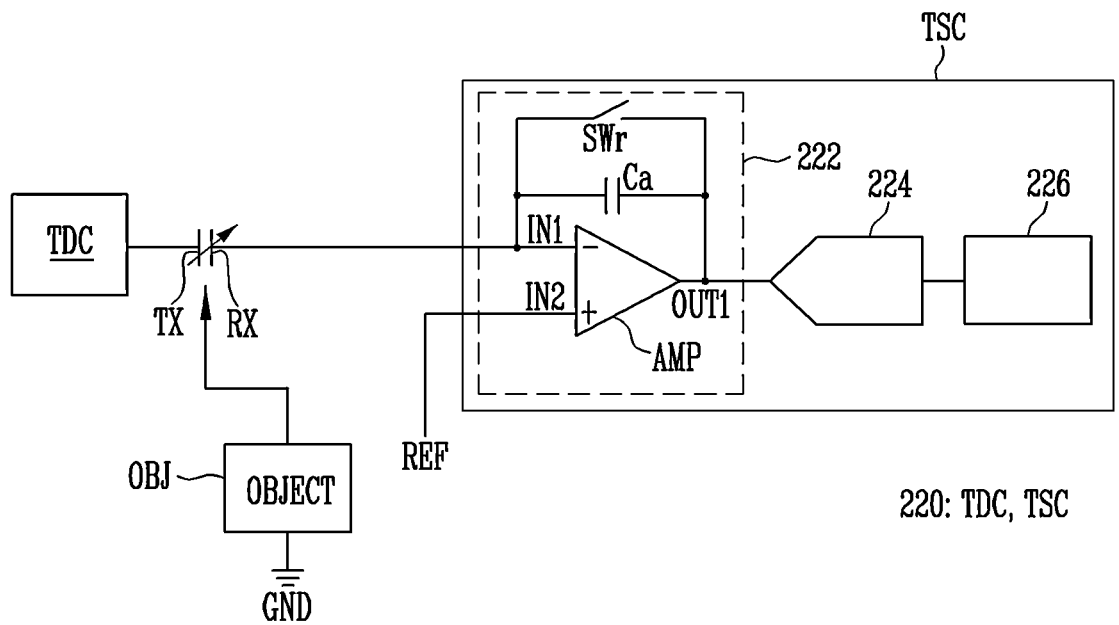
FIG. 5 is a diagram illustrating an embodiment of a first sensor driver included in the display device of FIG. 1.
Figure 6:
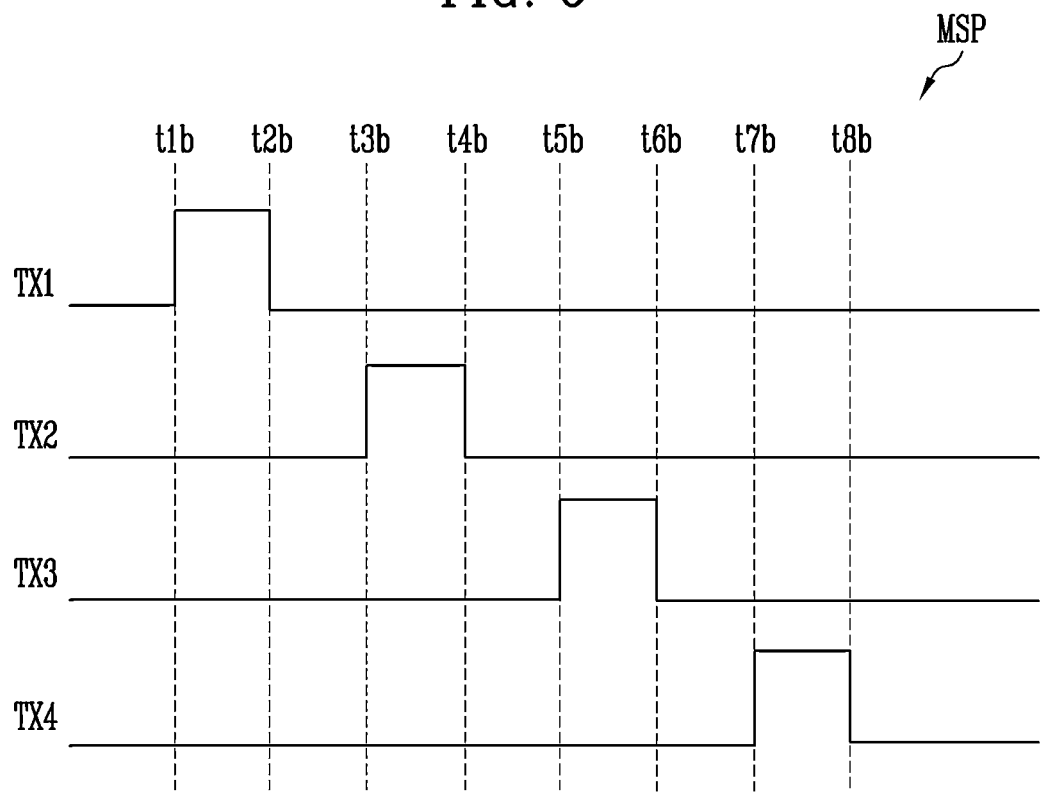
FIG. 6 is a waveform diagram for describing the operation of the first sensor driver included in the display device of FIG. 1.

FIG. 5 is a diagram illustrating an embodiment of the first sensor driver 220 included in the display device 1 of FIG. 1. FIG. 5 illustrates the configuration of the first sensor driver 220 based on any one sensor channel 222. For convenience of explanation, FIG. 5 further illustrates first sensors TX, second sensors RX, and an object OBJ. FIG. 6 is a waveform diagram for describing the operation of the first sensor driver 220 included in the display device of FIG. 1.

Referring to FIGS. 1 to 6, the first sensor driver 220 may include a sensor receiver TSC and a sensor transmitter TDC. The sensor transmitter TDC may be connected to the first sensors TX, and the sensor receiver TSC may be connected to the second sensors RX.

The sensor receiver TSC may include a sensor channel 222, an analog-digital converter 224, and a processor 226. For example, each sensor channel 222 may be implemented as an analog front end (AFE) including at least one operational amplifier AMP. The analog-digital converter 224 and the processor 226 may be provided in each sensor channel 222, or may be shared by a plurality sensor channels 222.

A first input terminal IN1 of the operational amplifier AMP may be connected to the corresponding second sensors RX. A second input terminal IN2 of the operational amplifier AMP may be connected to a reference signal REF. For example, the first input terminal IN1 may be an inverting terminal, and the second input terminal IN2 may be a non-inverting terminal. The reference signal REF may be a ground voltage or a voltage having a certain magnitude. In an embodiment, the reference signal REF may be a signal which is provided through any one second sensor among the second sensors RX.

The analog-digital converter 224 may be connected to an output terminal OUT1 of the operational amplifier AMP. The analog-digital converter 224 may convert output of the operational amplifier AMP to a digital sensing value, and output the digital sensing value. A capacitor Ca and a switch SWr may be connected in parallel between the first input terminal IN1 and the output terminal OUT1.

Referring to FIG. 6, during a sensing period MSP, the first sensor driver 220 (e.g., the sensor transmitter TDC) may sequentially supply first driving signals (or signals for driving the sensor component 120 to perform a sensing operation) to the first sensors TX1 to TX4. For example, first driving signals may be supplied to the first sensor TX1 two times t1b and t2b, first driving signals may be supplied to the first sensor TX2 two times t3b and t4b, first driving signals may be supplied to the first sensor TX3 two times t5b and t6b, and first driving signals may be supplied to the first sensor TX4 two times t7b and t8b. The number of times the first driving signals are supplied to each of the first sensors TX1 to TX4 may be greater than two, depending on the embodiment.

Each of the first driving signals may correspond to rising transition and/or falling transition. For example, the first driving signal of time point t1b may correspond to the rising transition. In other words, at time point t1b, the first driving signal may increase from a low level to a high level. The first driving signal at time point t2b may correspond to a falling transition. In other words, at time point t2b, the first driving signal may decrease from a high level to a low level.

The sensor receiver TSC may include a plurality of sensor channels 222 connected to a plurality of second sensors RX. Each of the sensor channels 222 may receive first sensing signals (or first sampling signals) corresponding to first driving signals from the corresponding second sensor. For example, at time point t1b, in response to a first driving signal applied to the first sensor TX1, the sensor channels 222 connected to the second sensors RX1 to RX4 may independently receive first sensing signals. Furthermore, at time point t2b, in response to a first driving signal applied to the first sensor TX1, the sensor channels 222 connected to the second sensors RX1 to RX4 may independently receive first sensing signals.

In the sensing area SA, depending on a position of the object OBJ such as the finger of the user, mutual capacitance between the first sensors TX1 to TX4 and the second sensors RX1 to RX4 may be changed, so that the first sensing signals received to the sensor channels 222 may also differ from each other. A touch position of the object OBJ may be detected by using a difference between the first sensing signals.

The sensor channel 222 may generate an output signal corresponding to a difference in voltage between the first and second input terminals IN1 and IN2. For example, the sensor channel 222 may amplify a differential voltage between the first and second input terminals IN1 and IN2 by a degree corresponding to a certain gain, and output the amplified voltage.

In an embodiment, the sensor channel 222 may be implemented as an integrator. In this case, the capacitor Ca and the switch SWr may be connected in parallel between the first input terminal IN1 and the output terminal OUT of the operational amplifier AMP. For example, as the switch SWr is turned on before a first sampling signal is received, charges of the capacitor Ca may be initialized. The switch SWr may be in a turned-off state at a time point at which the first sensing signal is received.

The analog-digital converter 224 may convert an analog signal inputted from each of the sensor channels 222 to a digital signal. The processor 226 may analyze the digital signal and detect the input from the user. The processor 226 may be included in the application processor 30.

Figure 7:
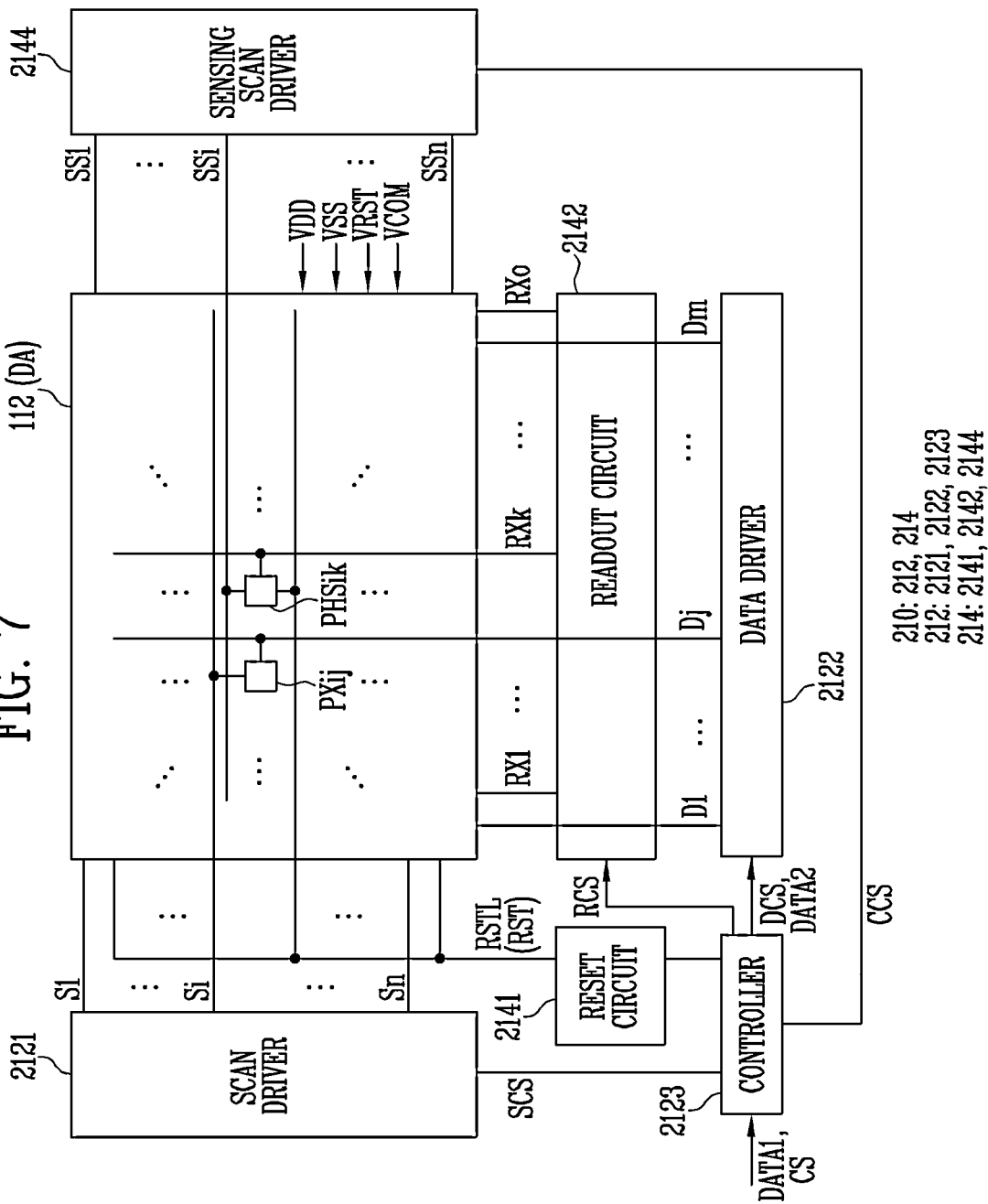
FIG. 7 is a diagram illustrating an embodiment of a display component and a driving circuit included in the display device of FIG. 1.

FIG. 7 is a diagram illustrating an embodiment of the display component and the driving circuit included in the display device 1 of FIG. 1.

Referring to FIGS. 1, 2, and 7, a pixel component 112 may include signal lines, pixels PX, and photo sensors PHS. The signal lines may include scan lines S1, . . . , Si, . . . , and Sn, data lines D1, . . . , Dj, . . . , and Dm, readout lines RX1, . . . , RXk, . . . , and RXo, and sensing scan lines SS1, . . . , SSi, . . . , and SSn, and a reset control line RSTL (or a reset line). Here, n, m, and o may each be a natural number.

The pixels PX may be disposed or positioned in an area (e.g., a pixel area) defined by the scan lines S1 to Sn and the data lines D1 to Dm. The photo sensors PHS may be disposed or positioned in an area defined by the sensing scan lines SS1 to SSn and the readout lines RX1 to RXo. The pixels PX and the photo sensors PHS may be arranged in a two-dimensional array in the display area DA, but the present disclosure is not limited thereto.

Each of the pixels PX may be electrically connected to at least one of the scan lines S1 to Sn and one of the data lines D1 to Dm. Each of the photo sensors PHS may be electrically connected to one of the sensing scan lines SS1 to SSn, one of the readout lines RX1 to RXo, and the reset control line RSTL. The connection configuration between the pixels PX, the photo sensors PHS, and the signal lines will be described below with reference to FIG. 8.

Power voltages VDD, VSS, VRST, and VCOM needed to drive the pixels PX and the photo sensors PHS may be provided to the pixel component 112. The power voltages VDD, VSS, VRST, and VCOM may be provided from a power supply. The power supply may be implemented as a power management IC (PMIC).

The driving circuit 210 may include a scan driver 2121, a data driver 2122, a controller 2123 (or a timing controller), a reset circuit 2141, a readout circuit 2142, and a sensing scan driver 2144.

For example, the scan driver 2121, the data driver 2122, and the controller 2123 may be included in the panel driver 212. The reset circuit 2141, the readout circuit 2142, and the sensing scan driver 2144 may be included in the second sensor driver 214. However, the present disclosure is not limited thereto. For example, the reset circuit 2141 may be included in the panel driver 212.

The scan driver 2121 may be electrically connected to the pixels PX by the scan lines S1 to Sn. The scan driver 2121 may generate scan signals based on a scan control signal SCS (or a gate control signal) and provide the scan signals to the scan lines S1 to Sn. Here, the scan control signal SCS may include a start signal, clock signals, and the like, and may be provided from the controller 2123 to the scan driver 2121.

The scan driver 2121 along with the pixels PX may be formed in the pixel component 112. However, the scan driver 2121 is not limited thereto. For example, the scan driver 2121 may be implemented as an integrated circuit.

A pixel that is selected and driven by the scan driver 2121 may emit light at a luminance corresponding to a data signal provided from the data line. For example, a pixel PXij that is selected and driven through an i-th scan line Si may emit light at a luminance corresponding to a data signal provided to a j-th data line Dj, where, i and j each are a natural number.

The data driver 2122 may generate a data signal (or data voltage) based on image data DATA2 and a data control signal DCS that are provided from the controller 2123, and provide the data signal to the pixel component 112 (or the pixels PX) through the data lines D1 to Dm. Here, the data control signal DCS may be a signal for controlling the operation of the data driver 2122, and include a data enable signal (or load signal) for instructing a valid data signal to be outputted, a horizontal start signal, a data clock signal, and the like.

The controller 2123 may receive input image data DATA1 and a control signal CS from an external device (e.g., a graphic processor, or an application processor), generate a scan control signal SCS and a data control signal DCS based on the control signal CS, and generate image data DATA2 by converting the input image data DATA1. Here, the control signal CS may include a vertical synchronization signal, a horizontal synchronization signal, a reference clock signal, and the like. The vertical synchronization signal may refer to a start of frame data (i.e., data corresponding to a frame section in which one frame image is displayed). The horizontal synchronization signal may refer to a start of a data row (i.e., one data row among a plurality of data rows included in the frame data). The controller 2123 may convert the input image data DATA1 to the image data DATA2 having a format corresponding to pixel arrangement in the pixel component 112. Furthermore, the controller 2123 may generate a reset control signal and a readout control signal RCS, based on the control signal CS.

The reset circuit 2141 may be connected in common to all photo sensors PHS provided in the pixel component 112 through one reset control line RSTL. The reset circuit 2141 may simultaneously provide a reset signal RST (or a reset control signal) to the photo sensors PHS in response to the reset control signal. Here, the reset signal RST may be a control signal for providing the reset voltage VRST to the photo sensors PHS. Because the reset signal RST is simultaneously provided to the photo sensors PHS, the reset signal RST may be referred to as a global reset signal.

The readout circuit 2142 may receive sensing signals from the photo sensors PHS through the readout lines RX1 to RXo, and perform a signal processing operation for the sensing signals. For example, the readout circuit 2142 may perform a correlated double sampling (CDS) operation to remove a noise from the sensing signals provided from the photo sensors PHS.

The sensing scan driver 2144 may be electrically connected to the photo sensors PHS through the sensing scan lines SS1, . . . , SSi, . . . , and SSn. The sensing scan driver 2144 may generate sensing scan signals based on a sensing control signal CCS, and provide the sensing scan signals to the sensing scan lines SS1 to SSn. In other words, the sensing scan driver 2144 may select the photo sensors PHS while scanning the pixel component 112. The sensing scan driver 2144 along with the photo sensors PHS may be formed in the pixel component 112. However, the sensing scan driver 2144 is not limited thereto. For example, the sensing scan driver 2144 may be implemented as an integrated circuit.

A photo sensor that is selected and driven by the scan driver 2144 may output, to the corresponding readout line, an electrical signal (i.e., a sensing signal, for example, current/voltage) corresponding to sensed light. For example, a photo sensor PHSik that is selected and driven through the i-th sensing scan line SSi may output an electrical signal corresponding to the sensed light to a k-th readout line RXk, where, k is a natural number.

The readout circuit 2142 may convert an analog sensing signal to a digital signal (or digital value). The readout sensing signals (or digital sensing signals) may be provided to an external device as a piece of sensing data.

In an embodiment, biometric authentication (e.g., fingerprint authentication) may be performed based on the sensing data. In an embodiment, input from the object OBJ to the display device 1 may be sensed based on the sensing data.

Figure 8:
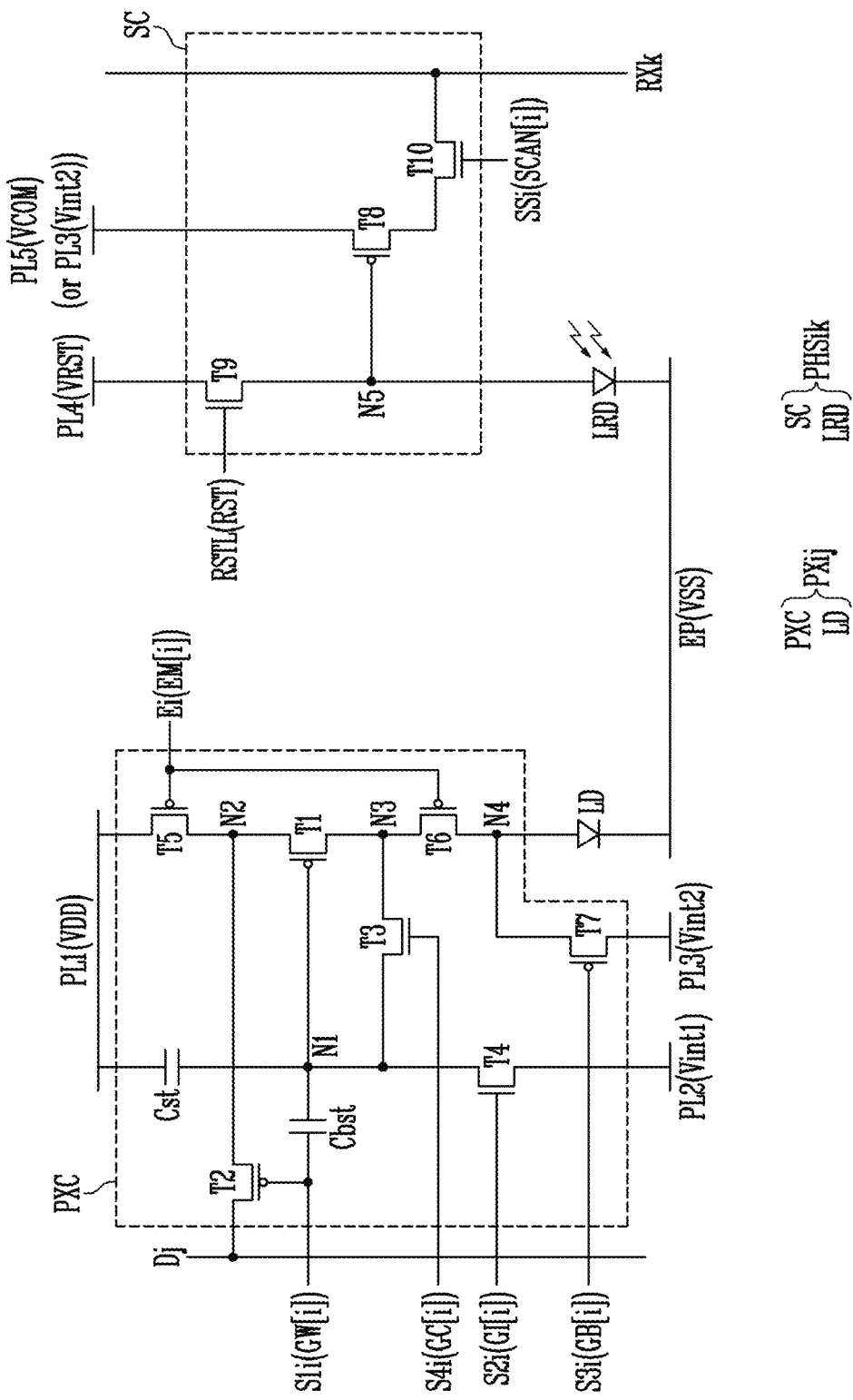
FIG. 8 is a circuit diagram illustrating an embodiment of a pixel and a photo sensor illustrated in FIG. 7.

FIG. 8 is a circuit diagram illustrating an embodiment of the pixel and the photo sensor illustrated in FIG. 7. For convenience of description, FIG. 8 illustrates the pixel PXij that is positioned on the i-th horizontal line (or the i-th pixel row) and connected to the j-th data line Dj. For convenience of description, FIG. 8 illustrates the photo sensor PHSik that is positioned on the i-th horizontal line (or the i-th pixel row) and connected to the k-th readout line RXk. In an embodiment, i-th scan lines S1$i$ to S4$i$ may be included in the i-th scan line Si illustrated in FIG. 7.

Referring to FIG. 8, the pixel PXij and the photo sensor PHSik may be disposed on the i-th horizontal line.

The pixel PXij may include a light emitting element LD and a pixel circuit PXC. In an embodiment, the pixel circuit PXC may include first, second, third, fourth, fifth, sixth, and seventh transistors T1, T2, T3, T4, T5, T6, and T7, a storage capacitor Cst, and a boost capacitor Cbst.

The first transistor T1 (or driving transistor) may be connected between a first power line PL1 and a first electrode of the light emitting element LD. The first transistor T1 may include a gate electrode connected to a first node N1. The first transistor T1 may control, in response to the voltage of the first node N1, the amount of current (or driving current) flowing from the first power line PL1 to an electrode EP (or a power line) via the light emitting element LD. A first power voltage VDD may be provided to the first power line PL1. A second power voltage VSS may be provided to the electrode EP. The first power voltage VDD may be set to a voltage higher than the second power voltage VSS.

The second transistor T2 may be connected between the j-th data line Dj and a second node N2. A gate electrode of the second transistor T2 may be connected to the 1$i$-th first scan line S1$i$ (or a first scan line). When a first scan signal GW[i](e.g., a first scan signal of a low level) is supplied to the 1$i$-th first scan line S1$i$, the second transistor T2 may be turned on to electrically connect the j-th data line Dj to the second node N2. In the case where each of the first transistor T1 and the third transistor T3 is turned on, the second transistor T2 may transmit a data signal of the j-th data line Dj to the first node N1 in response to the first scan signal GW[i].

The third transistor T3 may be connected between the first node N1 and the third node N3. A gate electrode of the third transistor T3 may be connected to the 4$i$-th scan line S4$i$ (or a third scan line). The third transistor T3 may be turned on when a fourth scan signal GC[i] is supplied to the 4i-th scan line S4i. If the third transistor T3 is turned on, the first transistor T1 may have a diode-connected form.

The fourth transistor T4 may be connected between the first node N1 and the second power line PL2. A gate electrode of the fourth transistor T4 may be connected to the 2i-th scan line S2i (or a second scan line). A first initialization power voltage Vint1 may be provided to the second power line PL2. The fourth transistor T4 may be turned on by a second scan signal GI[i] supplied to the 2i-th scan line S2i. If the fourth transistor T4 is turned on, the first initialization power voltage Vint1 may be supplied to the first node N1 (i.e., the gate electrode of the first transistor T1).

The fifth transistor T5 may be connected between the first power line PL1 and the second node N2. A gate electrode of the fifth transistor T5 may be connected to an i-th emission control line Ei. The sixth transistor T6 may be connected between the third node N3 and the light emitting element LD (or a fourth node N4). A gate electrode of the sixth transistor T6 may be connected to the i-th emission control line Ei. The fifth transistor T5 and the sixth transistor T6 may be turned off when an emission control signal EM[i](e.g., an emission control signal EM[i] of a high level) is supplied to the i-th emission control line Ei, and may be turned on in the other cases.

The seventh transistor T7 may be connected between the first electrode (i.e., the fourth node N4) of the light emitting element LD and a third power line PL3. A gate electrode of the seventh transistor T7 may be connected to the 3i-th scan line S3i. A second initialization power voltage Vint2 may be provided to the third power line PL3. In an embodiment, the second initialization power voltage Vint2 may be identical to or different from the first initialization power voltage Vint1. The seventh transistor T7 may be turned on by a third scan signal GB[i] supplied to the 3i-th scan line S3i, so that the second initialization power voltage Vint2 may be supplied to the first electrode of the light emitting element LD.

The storage capacitor Cst may be connected or formed between the first power line PL1 and the first node N1.

The boost capacitor Cbst (or a capacitor) may be connected or formed between the gate electrode of the second transistor T2 and the gate electrode of the first transistor T1.

The photo sensor PHSik may include a sensor circuit SC and a light receiving element LRD. The sensor circuit SC may include eighth, ninth, and tenth transistors T8, T9, and T10.

The eighth and tenth transistors T8 and T10 may be connected in series between a fifth power line PL5 and a k-th readout line RXk, where k is a natural number.

The eighth transistor T8 (or a first sensor transistor) may be connected between the fifth power line PL5 and the tenth transistor T10. A gate electrode of the eighth transistor T8 may be connected to a fifth node N5 (or a sensor node). The eighth transistor T8 may control current flowing from the fifth power line PL5 to the k-th readout line RXk through the tenth transistor T10 in response to a voltage of the fifth node N5. A common voltage VCOM may be provided to the fifth power line PL5.

In an embodiment, the fifth power line PL5 may be electrically connected to or integrally formed with the third power line PL3. The common voltage VCOM applied to the fifth power line PL5 may be the same as the second initialization power voltage Vint2. The present disclosure is not limited to the foregoing. For example, the fifth power line PL5 may be electrically connected to or integrally formed with the second power line PL2. The common voltage VCOM applied to the fifth power line PL5 may be the same as the first initialization power voltage Vint1.

The tenth transistor T10 (or a second sensor transistor, or a switching transistor) may be connected between the eighth transistor T8 and the k-th readout line RXk. A gate electrode of the tenth transistor T10 may be connected to the sensing scan line SSi.

The ninth transistor T9 (or a third sensor transistor) may be connected between a fourth power line PL4 (or a reference power line) and the fifth node N5. A gate electrode of the ninth transistor T9 may be connected to the reset control line RSTL. A reset voltage VRST may be provided to the fourth power line PL4.

At least one light receiving element LRD may be connected between the fifth node N5 and the electrode EP to which the second power voltage VSS is to be provided.

The light receiving element LRD may generate charge (or current) based on incident light. In other words, the light receiving element LRD may perform a function of photoelectric transformation. For example, the light receiving element LRD may be implemented as a photo diode.

If the ninth transistor T9 is turned on in response to a reset signal RST supplied to the reset control line RSTL, the reset voltage VRST may be provided to the fifth node N5. For example, the voltage of the fifth node N5 may be reset by the reset voltage VRST. After the reset voltage VRST has been applied to the fifth node N5, the light receiving element LRD may perform a function of photoelectric transformation.

The voltage of the fifth node N5 may be changed by the operation of the light receiving element LRD. The voltage of the fifth node N5 (or the charge or current generated from the light receiving element LRD) may be changed depending on the intensity of light that is incident on the light receiving element LRD or the time during which light is incident (or the time during which the light receiving element LRD is exposed).

If the tenth transistor T10 is turned on by a sensing scan signal SCAN[i] supplied to the sensing scan line SSi, a detection value (current and/or voltage) generated based on the voltage of the fifth node N5 may flow to the k-th readout line RXk.

In an embodiment, each of the pixel circuit PXC and the sensor circuit SC may include a P-type transistor and an N-type transistor. In an embodiment, each of the third transistor T3, the fourth transistor T4, the ninth transistor T9, and the tenth transistor T10 may be formed of an oxide semiconductor transistor including an oxide semiconductor. For example, each of the third transistor T3, the fourth transistor T4, the ninth transistor T9, and the tenth transistor T10 may be formed of an N-type oxide semiconductor transistor, and include an oxide semiconductor layer as an active layer.

The oxide semiconductor transistor may be produced through a low-temperature process, and have low charge mobility compared to that of the poly-silicon semiconductor transistor. In other words, the oxide semiconductor transistor may have excellent off-current characteristics. Therefore, generation of leakage current on the third transistor T3, the fourth transistor T4, the ninth transistor T9, and tenth transistor T10 may be minimized.

The other transistors (e.g., the first, second, fifth, sixth, seventh, and eighth transistors T1, T2, T5, T6, T7, and T8) may be formed of a poly-silicon transistor including a silicon semiconductor, and may include a poly-silicon semiconductor layer as an active layer. For example, the active layer may be formed through a low-temperature poly-silicon (LTPS) process. For example, the poly-silicon transistor may be a P-type poly-silicon transistor. Because a poly-silicon semiconductor transistor has an advantage of a high response speed, the poly-silicon semiconductor transistor may be applied to a switching element in which a high-speed switching operation is required.

In the case where the tenth transistor T10 is implemented as an oxide semiconductor transistor, current leaking through the k-th readout line RXk may be minimized. Therefore, the sensing sensitivity of the photo sensor PHS including the sensor circuit SC may be enhanced.

Figure 9:
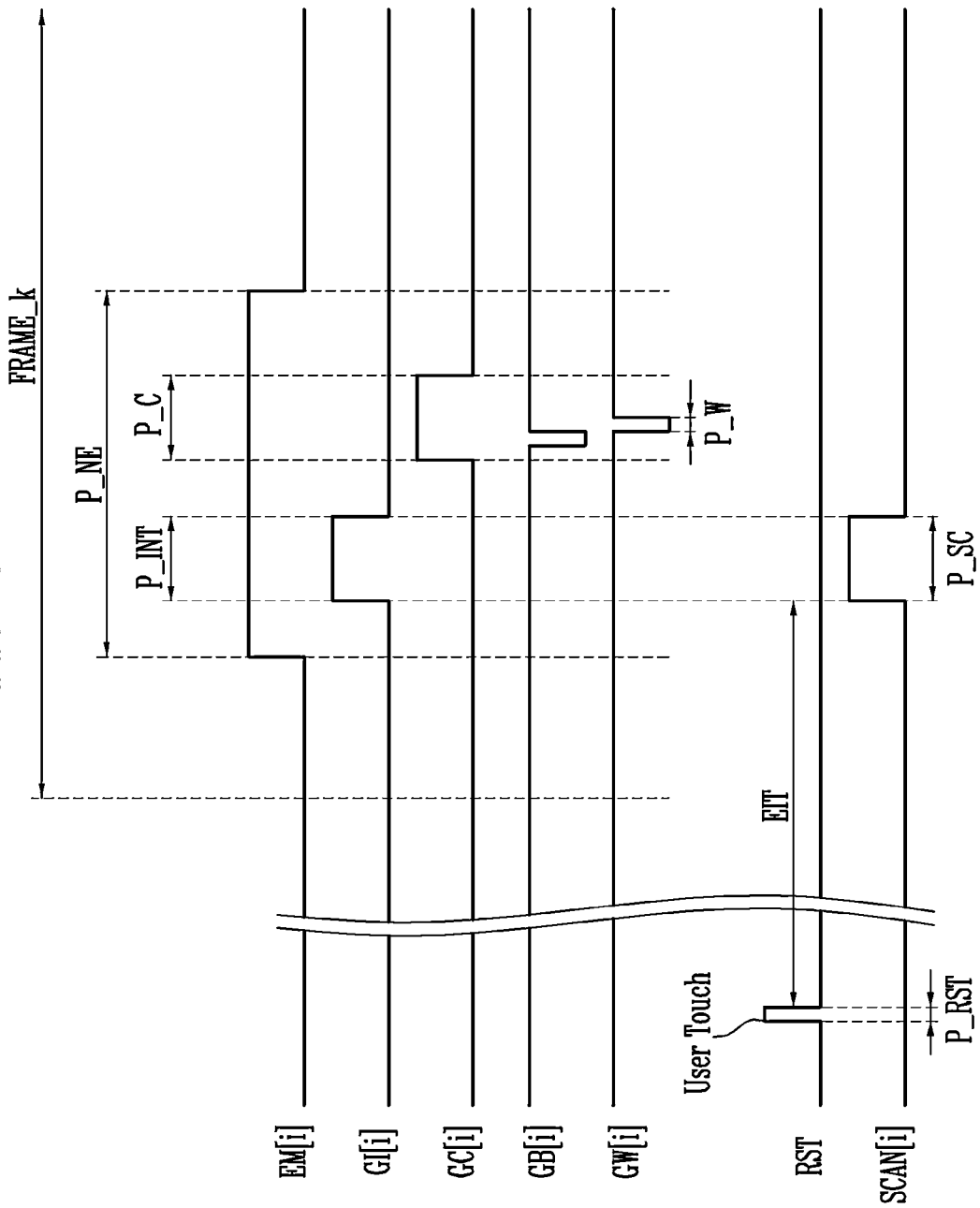
FIG. 9 is a waveform diagram illustrating an embodiment of the operation of the pixel and the photo sensor of FIG. 8.

FIG. 9 is a waveform diagram illustrating an embodiment of the operation of the pixel and the photo sensor of FIG. 8.

Referring to FIG. 9, the emission control signal EM[i] may be provided to the i-th emission control line Ei, the second scan signal GI[i] may be provided to the 2i-th scan line S2i, the fourth scan signal GC[i] may be provided to the 4i-th scan line S4i, the third scan signal GB[i] may be provided to the 3i-th scan line S3i, and the first scan signal GW[i] may be provided to the 1i-th scan line S1i. The reset signal RST may be provided to the reset control line RSTL. A sensing scan signal SCAN[i] may be provided to the sensing scan line SSi.

The sensing scan signal SCAN[i](or the i-th sensing scan signal) may refer to a signal which is provided to the gate electrode of the tenth transistor T10. When the sensing scan signal SCAN[i] is supplied, a detection value may be supplied to the readout line RXk. In other words, when the sensing scan signal SCAN[i] is supplied, user's fingerprint or touch input may be detected.

For the aforementioned purpose, the sensing scan signal SCAN[i] may be supplied at least two or more times during one frame period. For example, the user's fingerprint may be detected at least once during one frame period, and input (or a touch) of the object OBJ may be detected at least once during one frame period.

A k-th frame section FRAME_k may include a non-emission section P_NE. The non-emission section P_NE (or the k-th frame section FRAME_k) may include an initialization section P_INT, a compensation section P_C, and a write section P_W. The write section P_W may be included in the compensation section P_C. For example, the write section P_W may include one horizontal time, each of the initialization section P_INT and the compensation section P_C may include six horizontal times, and the non-emission section P_NE may include twenty-six horizontal times, but the present disclosure is not limited thereto.

In the non-emission section P_NE, the emission control signal EM[i] may have a high level. In this case, in response to the emission control signal EM[i] having a high level, the fifth transistor T5 and the sixth transistor T6 may be turned off, and the pixel PX may not emit light.

In the initialization section P_INT, the second scan signal GI[i] may have a high level. In this case, in response to the second scan signal GI[i] having a high level, the fourth transistor T4 may be turned on, and the first initialization power voltage Vint1 of the second power line PL2 may be provided to the first node N1 (or the gate electrode of the first transistor T1).

Thereafter, during the compensation section P_C, the fourth scan signal GC[i] may have a high level. In response to the fourth scan signal GC[i] having a high level, the third transistor T3 may be turned on, and the first transistor T1 may be diode-connected.

In the write section P_W, the first scan signal GW[i] may have a low level. In this case, in response to the first scan signal GW[i] having a low level, the second transistor T2 may be turned on, and a data signal may be provided from the j-th data line Dj to the second node N2. Furthermore, because the third transistor T3 remains turned on in response to the fourth scan signal GC[i] having a high level, the data signal may be transmitted from the second node N2 to the first node N1 through the first transistor T1 and the third transistor T3. Because the first transistor T1 remains in a diode-connected form by the turned-on third transistor T3, the voltage of the first node N1 may have a voltage obtained by compensating the data signal for a threshold voltage of the first transistor T1.

Before the write section P_W, the third scan signal GB[i] may have a low level. In this case, the seventh transistor T7 may be turned on in response to the third scan signal GB[i], and the second initialization power voltage Vint2 may be supplied to the first electrode of the light emitting element LD. The third scan signal GB[i] may be a first scan signal (e.g., GW[i−1]) provided to a previous row, but the present disclosure is not limited thereto.

Subsequently, the non-emission section P_NE may be terminated, and the emission control signal EM[i] may have a low level. In this case, in response to the emission control signal EM[i] having a low level, the fifth transistor T5 and the sixth transistor T6 may be turned on, and a current transfer path may be formed from the first power line PL1 to the electrode EP through the fifth transistor T5, the first transistor T1, the sixth transistor T6, and the light emitting element LD. Furthermore, driving current corresponding to a voltage (e.g., a data signal) of the first node N1 may flow through the light emitting element LD by the operation of the first transistor T1, so that the light emitting element LD may emit light having a luminance corresponding to the driving current.

In a reset section P_RST before the k-th frame section FRAME_k, the reset signal RST may have a high level. The reset circuit 2141 may provide a reset signal RST having a high level to the reset control line RSTL. In response to the reset signal RST having a high level, the ninth transistor T9 may be turned on, and the reset voltage VRST may be applied to the fifth node N5. The voltage of the fifth node N5 may be reset by the reset voltage VRST.

Thereafter, the ninth transistor T9 may be turned off in response to the reset signal RST having a low level. In the case where light is incident on the light receiving element LRD during an exposure time EIT, the voltage of the fifth node N5 may be changed by the photoelectric transformation function of the light receiving element LRD.

In a sensing scan section P_SC of the k-th frame section FRAME_k, the sensing scan signal SCAN[i] may have a high level. Although in FIG. 9 there is described an example in which the sensing scan section P_SC and the initialization section P_INT have the same period of time, the position of the sensing scan section P_SC may be set in various ways.

In response to the sensing scan signal SCAN[i], the tenth transistor T10 may be turned on, so that the current (or a detection value) may flow from the fifth power line PL5 to the k-th readout line RXk in response to the voltage of the fifth node N5.

For example, in the case where a touch from the user is inputted to the pixel component 112, current, i.e., a detection value, corresponding to light reflected by the user (e.g., the finger of the user) may be outputted in the k-th frame section FRAME_k. For example, the fingerprint of the user may be sensed based on the detection value. For example, the touch input from the user may be sensed based on the detection value.

Figure 10A:
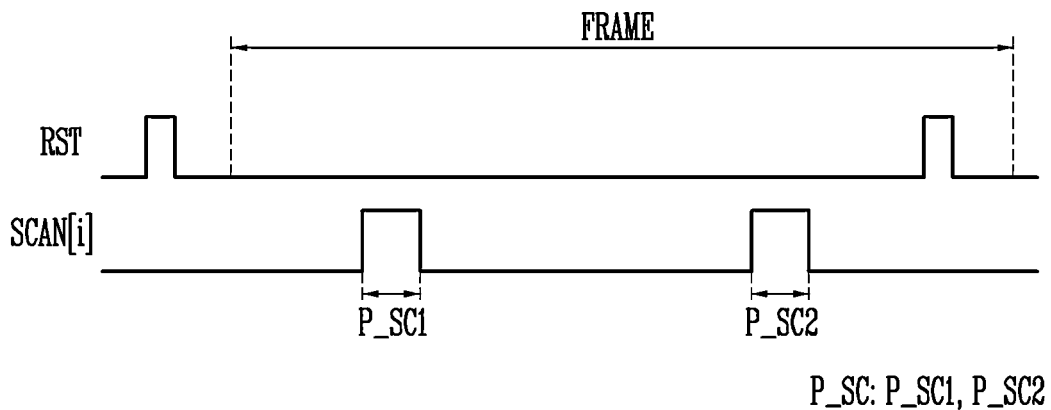
FIGS. 10A and 10B are diagrams illustrating an embodiment of a sensing scan section included in one frame period.
Figure 10B:
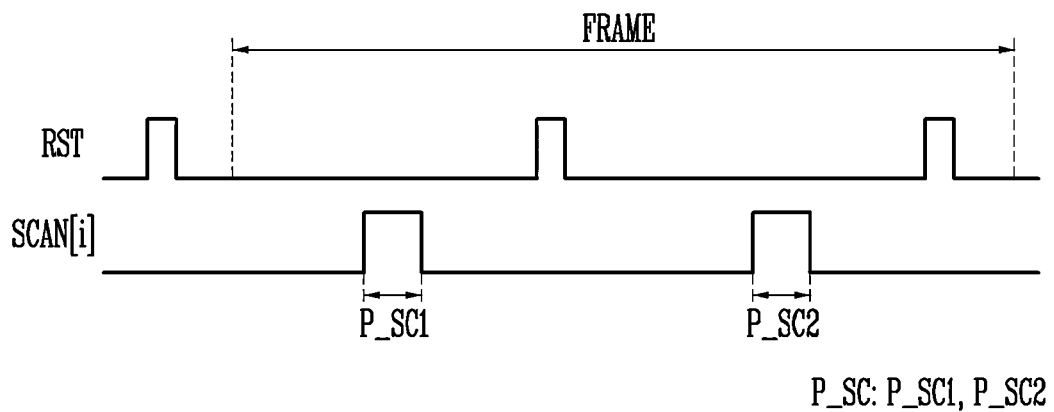

FIGS. 10A and 10B are diagrams illustrating an embodiment of a sensing scan section included in one frame period.

Figure 10C:
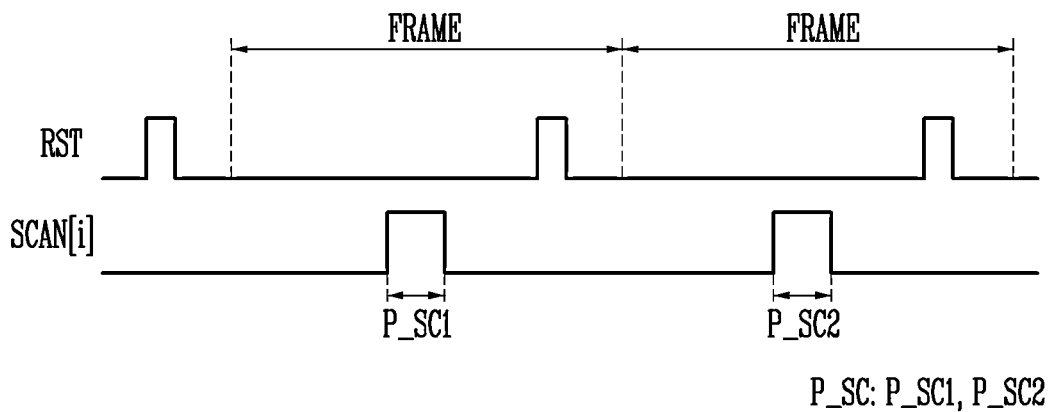
FIG. 10C is a diagram illustrating an embodiment of a sensing scan section included in two adjacent frame periods.

FIG. 10C is a diagram illustrating an embodiment of a sensing scan section included in two adjacent frame periods.

Referring to FIG. 10A, during one frame period, a reset signal RST of a low level is supplied at least one time. If the reset signal RST having a low level is supplied, the fifth node N5 is initialized by a reset voltage VRST.

One frame period may include at least two or more sensing scan sections P_SC. During the sensing scan section P_SC, the sensing scan signal SCAN[i] is set to a high level, so that the tenth transistor T10 may be turned on. A detection value supplied to the readout line RXk by turning on the tenth transistor T10 may be used to sense input from the object OBJ and/or the fingerprint of the user.

In an embodiment, during one frame period, a first sensing scan section P_SC1 (or a first sensing section) may be a section provided to sense the input from the object OBJ. In other words, the input (i.e., touch) from the object OBJ may be sensed by using a detection value in the first sensing scan section P_SC1.

In an embodiment, during one frame period, a second sensing scan section P_SC2 (or a second sensing section) may be a section provided to sense the fingerprint of the user. In other words, the fingerprint of the user may be detected by using a detection value in the second sensing scan section P_SC2.

Although in FIG. 10A there is illustrated an example in which a reset signal RST is supplied before the first sensing scan section P_SC1 and the second sensing scan section P_SC2, the present disclosure is not limited thereto. For example, as illustrated in FIG. 10B, a reset signal RST may be supplied even before the second sensing scan section P_SC2. The supply of the reset signal RST may be experimentally determined to more accurately sense the input from the object OBJ and/or the fingerprint of the user.

Referring to FIG. 10C, if the reset signal RST having a low level is supplied, the fifth node N5 is initialized by the reset voltage VRST.

One frame period may include one or more sensing scan periods P_SC. During the sensing scan period P_SC, the sensing scan signal SCAN[i] is set to a high level, so that the tenth transistor T10 may be turned on. A detection value supplied to the readout line RXk by turning on the tenth transistor T10 may be used to sense the input from the object OBJ and/or the fingerprint of the user.

In an embodiment, a sensing scan section P_SC1 in a first frame period of adjacent frames may be a section provided to sense the input from the object OBJ. In other words, the input (i.e., touch) from the object OBJ may be sensed by using a detection value in the sensing scan section P_SC1 of the first frame.

In an embodiment, a sensing scan section P_SC2 in a second frame period of the adjacent frames may be a section provided to sense the fingerprint of the user. In other words, the fingerprint of the user may be detected by using a detection value in the sensing scan section P_SC2 of the second frame.

As described above, the second sensor driver 214 may alternately sense the input of the object OBJ and the fingerprint of the user in each frame. In an embodiment, the second sensor driver 214 may alternately sense the input of the object OBJ and the fingerprint of the user on a per-frame basis. In an embodiment, the second sensor driver 214 may alternately sense the input of the object OBJ and the fingerprint of the user on different frame units.

Figure 11:
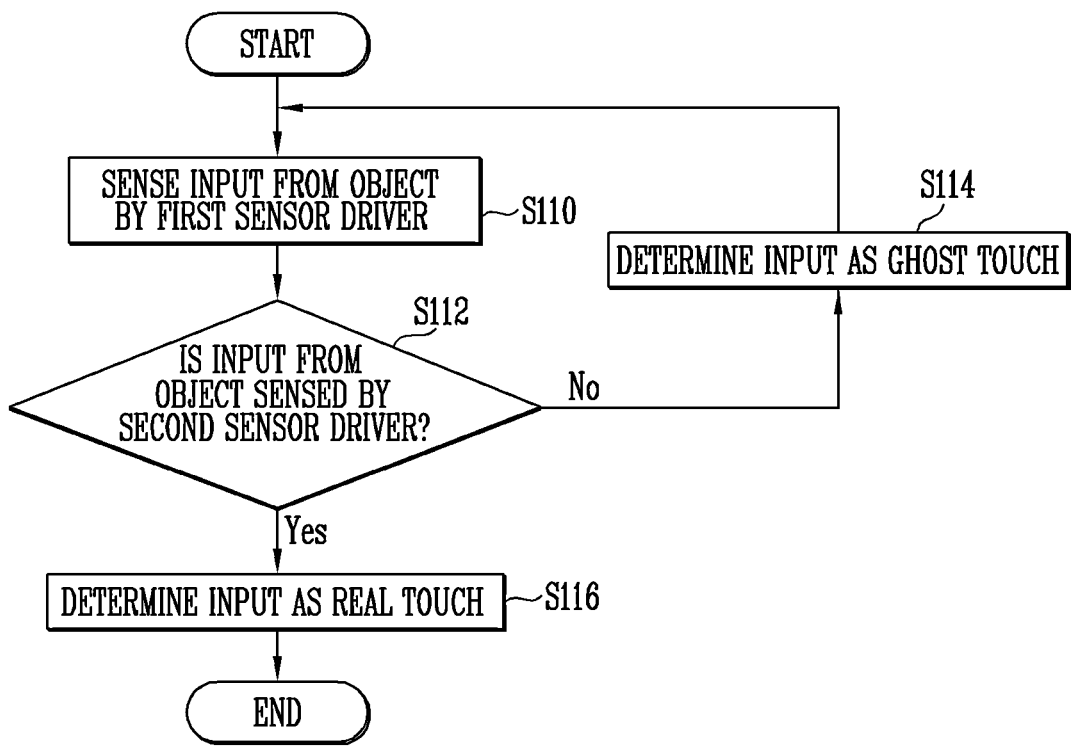
FIG. 11 is a flowchart for describing object input sensing in accordance with an embodiment of the present disclosure.

FIG. 11 is a flowchart for describing object input sensing in accordance with an embodiment of the present disclosure.

FIGS. 12A to 12D are diagrams illustrating an example of an operation process corresponding to the flowchart in FIG. 11.

Figure 12A:
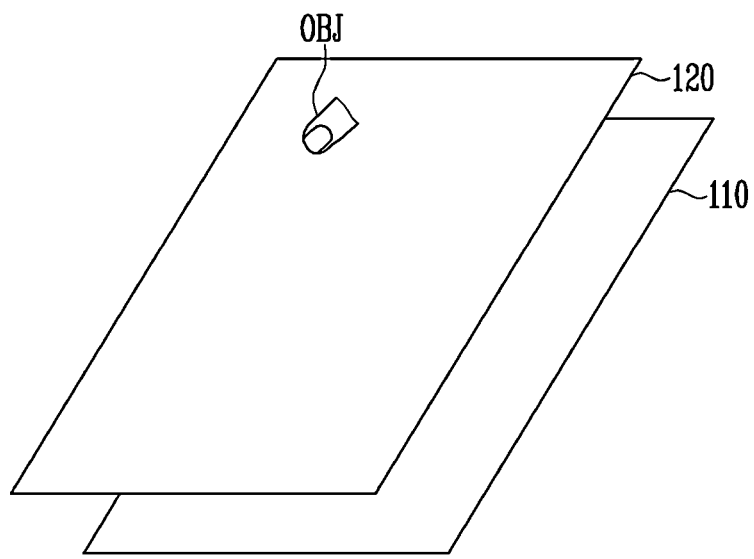
FIGS. 12A, 12B, 12C, and 12D are diagrams illustrating an example of an operation process corresponding to the flowchart in FIG. 11.

Referring to FIG. 11, the object OBJ (e.g., the finger of the user) may touch a specific point on the sensor component 120, as illustrated in FIG. 12A. The first sensor driver 220 may sense input from the object OBJ at an operation S110.

Figure 12B:
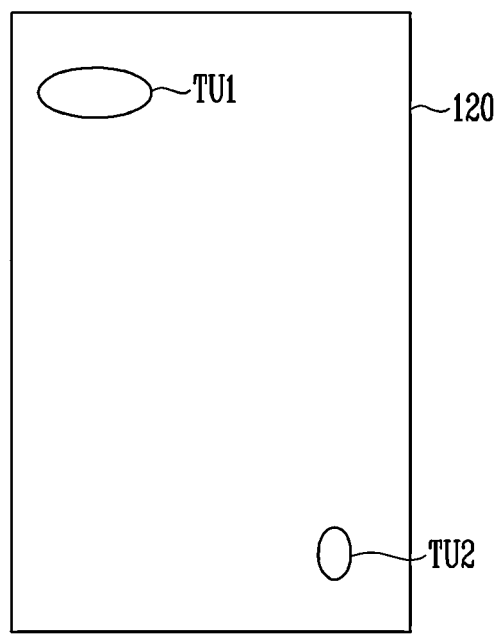

At the operation S110, as illustrated in FIG. 12B, in addition to a first touch area TU1 where the object OBJ is touched, a ghost touch, which is unintended by the user, can be sensed in a second touch area TU2. The ghost touch may occur due to abrupt changes in the surrounding environment (e.g., temperature fluctuations).

The first touch area TU1 and the second touch area TU2 sensed at the operation S110 may be supplied to the first sensor driver 220 as a sensing signal. The first sensor driver 220 may supply detection data corresponding to the first touch area TU1 and the second touch area TU2 to the application processor 30 using the sensing signal. Here, the application processor 30 may be replaced with the processor 226 shown in FIG. 5.

Figure 12C:
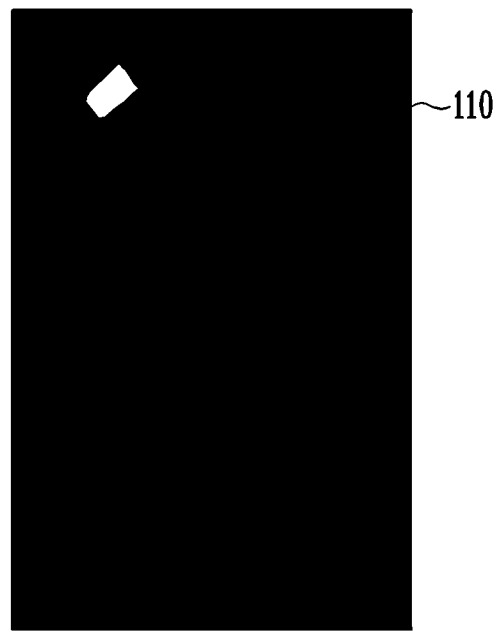
Figure 12D:
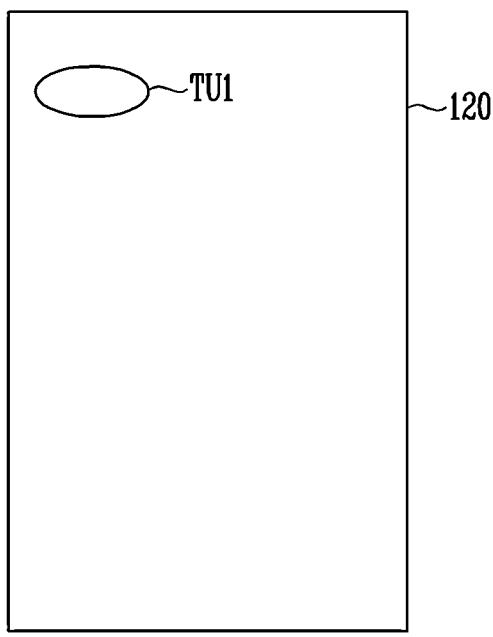

At an operation S112, the second sensor driver 214 may sense the input from the object OBJ, as illustrated in FIG. 12C. For example, the second sensor driver 214 may drive the photo sensors PHS during at least one sensing scan section P_SC included in one frame, thus sensing the input from the object OBJ. At the operation S112, the input from the object OBJ may be sensed in the first touch area TU1, and no input from the object OBJ may be sensed in the second touch area TU2.

A sensing result from the second sensor driver 214 may be supplied to the first sensor driver 220 as sensing data. The first sensor driver 220 may supply the sensing data to the application processor 30.

The application processor 30 may be supplied with the detection data from the first sensor driver 220, and may be supplied with sensing data from the second sensor driver 214. The application processor 30 supplied with the detection data and the sensing data may determine, as a real touch, the first touch area TU1 where the object OBJ is sensed through both the detection data and the sensing data at an operation S116, and may determine the second touch area TU2 as the ghost touch. Thereafter, the application processor 30 may perform a certain operation in response to the rear touch area (i.e., the first touch area TU1).

In the case where the second sensing driver 214 sense no input from the object OBJ, the application processor 30 may determine the input of the object OBJ sensed by the sensor component 120 as a ghost touch at an operation S114. In the case where the input of the object OBJ sensed by the sensor component 120 is determined to be a ghost touch, a separate operation corresponding to the input from the object OBJ may not be performed.

As described above, in an embodiment of the present disclosure, a touch may be primarily sensed by the first sensor driver 220, and the touch may be secondarily sensed by the second sensor driver 214. In this case, even if a ghost touch is inputted, a separate operation corresponding to the ghost touch may not be performed.

Figure 13:
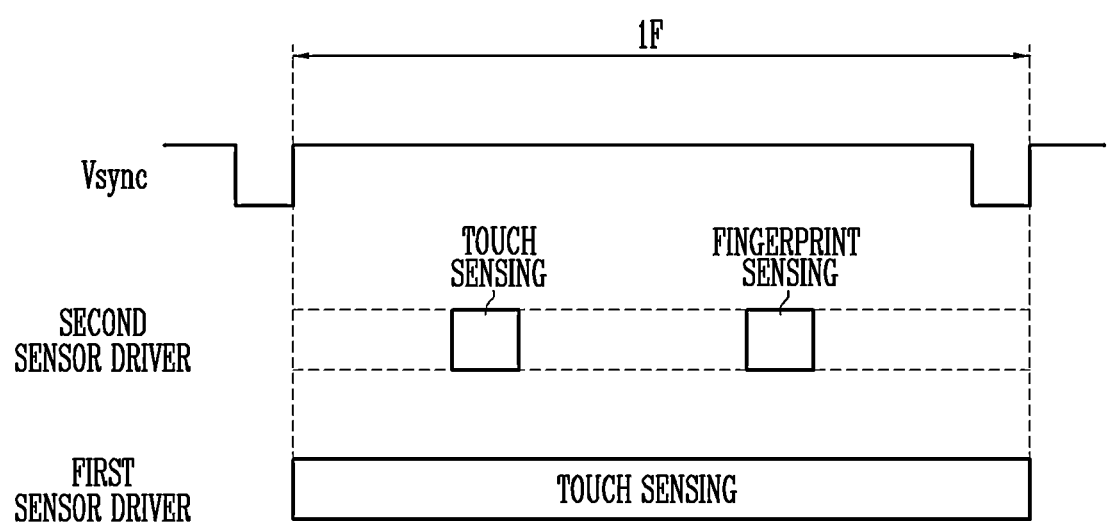
FIG. 13 is a diagram illustrating an embodiment of a touch and fingerprint recognition time during one frame period.

FIG. 13 is a diagram illustrating an embodiment of a touch and fingerprint recognition time during one frame period.

Referring to FIG. 13, a plurality of sensing scan sections P_SC may be included in one frame period (or one cycle of the vertical synchronization signal Vsync). Here, the second sensor driver 214 may sense input (i.e., a touch) from the object OBJ during at least one sensing scan section P_SC, and sense the fingerprint of the user during at least one sensing scan section P_SC. In other words, in the embodiment of the present disclosure, one frame period may be time-shared to sense the touch and the fingerprint. During one frame period, the first sensor driver 220 may sense the input from the object OBJ.

Figure 14:
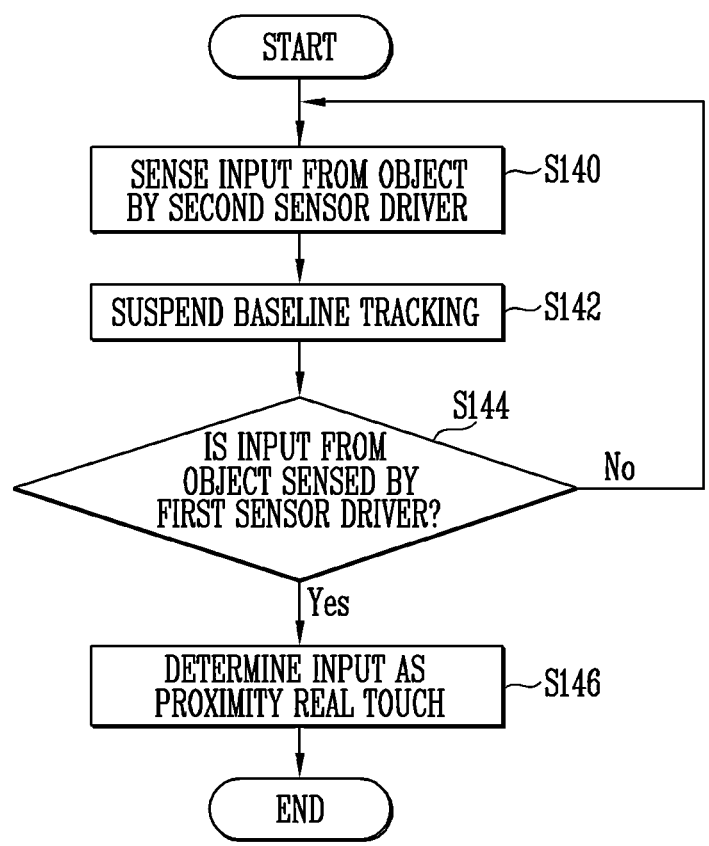
FIG. 14 is a flowchart for describing object input sensing in accordance with an embodiment of the present disclosure.

FIG. 14 is a flowchart for describing object input sensing in accordance with an embodiment of the present disclosure. FIG. 14 illustrates the case where proximity sensing is performed in a certain area on the sensor component 120.

Generally, a separate proximity sensor may be used for proximity sensing for the user and similar functions. However, to reduce the production cost, proximity sensing may be performed using the sensor component 120 instead of the proximity sensor. For the aforementioned purpose, an area expected to come into contact with the ear or cheek of the user may be set to a proximity touch area, and input from the object OBJ may be sensed in the proximity touch area. For example, an upper area of the panel 10 may be set to the proximity touch area.

The first sensor driver 220 may periodically set/update offset data (or baseline) in the absence of input from the object OBJ (i.e., may periodically perform baseline tracking), and may sense input from the object OBJ by reflecting the offset data in detection data. For example, the first sensor driver 220 may periodically change the baseline in response to surrounding environment or the like. Consequently, the object OBJ may not be detected in the proximity touch area.

Referring to FIG. 14, the second sensor driver 214 may sense input from the object OBJ in the proximity touch area at an operation S140. For example, the second sensor driver 214 may drive the photo sensors PHS during at least one sensing scan section P_SC included in one frame, thus sensing the input from the object OBJ. In the case where the input from the object OBJ is sensed, the second sensor driver 214 may supply corresponding sensing data to the first sensor driver 220.

In the case where the sensing data is inputted at the operation S140, the first sensor driver 220 temporarily suspends the baseline tracking at an operation S142. In the case where the baseline tracking is suspended, the baseline is set to a constant value, thus allowing the sensor component 120 to reliably sense touches.

After the baseline tracking is suspended at the operation S142, the first sensor driver 220 may detect the input form the object OBJ in the proximity touch area at an operation S144. At the operation S144, in the case where the object OBJ is not detected, the first sensor driver 220 may determine that no touch has occurred in the proximity touch area. In the case where the object OBJ is detected at the operation S144, it is determined that a real touch has occurred in the proximity touch area at an operation S146. In this case, the first sensor driver 220 may supply detection data corresponding to the detection of the object OBJ to the application processor AP. The application processor AP may perform an operation corresponding to the detection of the object OBJ.

In an embodiment of the present disclosure, in the proximity touch area, as illustrated in FIG. 11, the first sensor driver 220 may perform primary touch sensing, and the second sensor driver 214 may subsequently perform secondary touch sensing. Since the relevant information is the same as that described in FIG. 11, detailed explanation thereof will be omitted.

Figure 15:
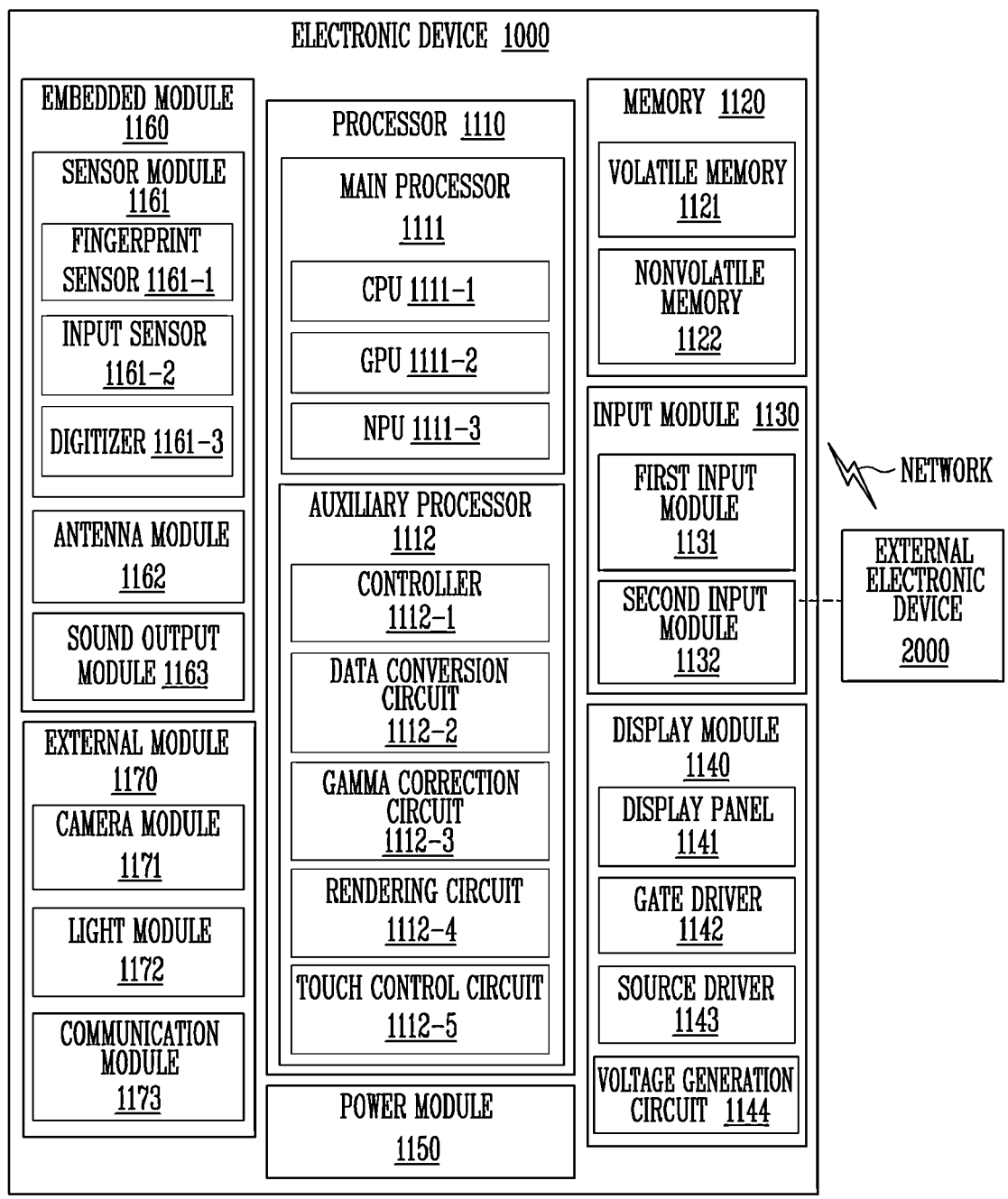
FIG. 15 is a diagram illustrating an electronic device in accordance with an embodiment of the present disclosure.

FIG. 15 is a diagram illustrating an electronic device 1000 in accordance with an embodiment of the present disclosure.

Referring to FIG. 15, the electronic device 1000 in accordance with an embodiment of the present disclosure may output a variety of information through a display module 1140. If a processor 1110 executes an application stored in a memory 1120, the display module 1140 may provide application information to the user through a display panel 1141.

The processor 1110 may acquire external input through an input module 1130 or a sensor module 1161, and execute an application corresponding to the external input. For example, in the case where the user selects a camera icon (or a camera application icon) displayed on the display panel 1141, the processor 1110 may acquire user input through an input sensor 1161-2, and activate a camera module 1171. The processor 1110 may transmit image data corresponding to an image captured by the camera module 1171 to the display module 1140. The display module 1140 may display, on the display panel 1141, an image corresponding to the captured image.

As another example, in the case where personal information authentication is executed through the display module 1140, a fingerprint sensor 1161-1 may acquire inputted fingerprint information as input data. The processor 1110 may compare input data acquired through the fingerprint sensor 1161-1 with authentication data stored in the memory 1120, and may execute an application depending on a result of the comparison. The display module 1140 may display, on the display panel 1141, information executed according to the logic of the application. The fingerprint sensor 1161-1 may be disposed to make it possible to acquire fingerprint information in the overall area of the display module 1140 (or the display panel 1141).

As a further example, in the case where a music streaming icon displayed on the display module 1140 is selected, the processor 1110 may acquire user input through the input sensor 1161-2, and activate a music streaming application stored in the memory 1120. If a music playing command is inputted in the music streaming application, the processor 1110 may activate a sound output module 1163 and provide sound information corresponding to the music playing command to the user.

Hitherto, a brief description of the operation of the electronic device 1000 has been provided. Hereinafter, the configuration of the electronic device 1000 will be described in detail. Some of the components of the electronic device 1000 to be described below may be integrated into a single component, or one component may be separated into two or more components.

The electronic device 1000 may communicate with an external electronic device 2000 through a network (e.g., a short-range wireless communication network or a long-range wireless communication network). In an embodiment, the electronic device 1000 may include the processor 1110, the memory 1120, the input module 1130, the display module 1140, a power module 1150, an embedded module 1160, and an external mounted module 1170. In an embodiment, in the electronic device 1000, at least one of the foregoing components may be omitted, or one or more other components may be added. In an embodiment, some components (e.g., the sensor module 1161, an antenna module 1162, or the sound output module 1163) among the foregoing components may be integrated into another component (e.g., the display module 1140).

The processor 1110 may execute software to control at least one other component (e.g., a hardware or software component) of the electronic device 1000 connected to the processor 1110 and perform various data processing or computing operations. In an embodiment, as at least a portion of a data processing or computing operation, the processor 1110 may store a command or data received from another component (e.g., the input module 1130, the sensor module 1161, or a communication module 1173) in a volatile memory 1121, process the command or data stored in the volatile memory 1121, and store result data in a nonvolatile memory 1122.

The processor 1110 may include a main processor 1111 and an auxiliary processor 1112. The main processor 1111 may include a central processing unit (CPU) 1111-1 (or an application processor (AP) 30 illustrated in FIG. 1). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU 1111-3 may be a processor specialized to process an artificial intelligence model. The artificial intelligence model may be generated by machine learning. The artificial intelligence model may include a plurality of artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more among the foregoing networks, but is not limited thereto. The artificial intelligence model may not only include a hardware structure but may also include an additional or substitutive software structure. At least two of the foregoing processing units and the processors may be implemented as a single integrated component (e.g., a single chip). Alternatively, the processing units and the processors may be implemented as respective independent components (e.g., a plurality of chips).

The auxiliary processor 1112 may include a controller 1112-1. The controller 1112-1 may include an interface conversion circuit and a timing control circuit. For example, the controller 1112-1 may include the controller 2123 shown in FIG. 7. The controller 1112-1 may receive an image signal from the main processor 1111, and may convert a data format of the image signal to a format corresponding to specifications of an interface with the display module 1140 and output image data. The controller 1112-1 may output various control signals needed to drive the display module 1140.

The auxiliary processor 1112 may further include a data conversion circuit 1112-2, a gamma correction circuit 1112-3, a rendering circuit 1112-4, a touch control circuit 112-5, etc. The data conversion circuit 1112-2 may receive image data from the controller 1112-1, compensate the image data to display an image at a desired luminance based on characteristics of the electronic device 1000 or settings of the user, or may convert the image data to reduce power consumption or compensate for afterimages.

The gamma correction circuit 1112-3 may convert image data, a gamma reference voltage, or the like so that an image to be displayed on the electronic device 1000 can have desired gamma characteristics. The rendering circuit 1112-4 may receive image data from the controller 1112-1, and render the image data taking into account pixel arrangement or the like on the display panel 1141 applied to the electronic device 1000.

The touch control circuit 1112-5 may supply a touch signal to the input sensor 1161-2, and receive a sensing signal from the input sensor 1161-2 in response to the touch signal. The touch control circuit 1112-5 may include the first sensor driver 220 illustrated in FIG. 1.

At least one of the data conversion circuit 1112-2, the gamma correction circuit 1112-3, the rendering circuit 1112-4, and the touch control circuit 1112-5 may be integrated into another component (e.g., the main processor 1111 or the controller 1112-1). At least one among the data conversion circuit 1112-2, the gamma correction circuit 1112-3, and the rendering circuit 1112-4 may be integrated into a source driver 1143 to be described below.

The memory 1120 may store a variety of data to be used in at least one component (e.g., the processor 1110 or the sensor module 1161) of the electronic device 1000, and input data or output data for a command pertaining to the data. Furthermore, the memory 1120 may store a variety of setting data corresponding to settings of the user. The memory 1120 may include at least one or more of the volatile memory 1121 and the nonvolatile memory 1122.

The input module 1130 may receive a command or data to be used in a component (e.g., the processor 1110, the sensor module 1161, or the sound output module 1163) of the electronic device 1000 from an external device (e.g., the user or an external electronic device 2000) provided outside the electronic device 1000.

The input module 1130 may include a first input module 1131 configured to receive a command or data from the user, and a second input module 1132 configured to receive a command or data from the external electronic device 2000. The first input module 1131 may include a microphone, a mouse, a keyboard, a key (e.g., a button), or a pen (e.g., a passive pen or an active pen). The second input module 1132 may support a designated protocol, which can be connected to the external electronic device 2000 in a wired or wireless manner.

In an embodiment, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), for physical connection with the external electronic device 2000.

The display module 1140 may provide visual information to the user. The display module 1140 may include the driving circuit 210 illustrated in FIG. 1. The display module 1140 may include the display panel 1141, a gate driver 1142, and a source driver 1143. The display module 1140 may further include a window, a chassis, and a bracket to protect the display panel 1141. The display module 1140 may include the display device 1 illustrated in FIG. 1.

The display panel 1141 (or a display) may include a liquid crystal display panel, an organic light emitting display panel, or an inorganic light emitting display panel. The type of display panel 1141 is not limited to a particular type. The display panel 1141 is a rigid type panel, or a flexible type panel, which is rollable or foldable. The display module 1140 may further include a support, a bracket, or a heat dissipater, which supports the display panel 1141. The display panel 1141 may include the panel 10 illustrated in FIG. 1.

The gate driver 1142 may be mounted on the display panel 1141 as a driving chip. The gate driver 1142 may be integrated on the display panel 1141. For example, the gate driver 1142 may include an amorphous silicon TFT gate (ASG) driver circuit, a low temperature polycrystalline silicon (LTPS) TFT gate driver circuit, or an oxide semiconductor TFT gate (OSG) driver circuit, which is internalized in the display panel 1141. The gate driver 1142 may receive a control signal from the controller 1112-1, and output scan signals to the display panel 1141 in response to the control signal. The gate driver 1142 may include the scan driver 2121 and the sensing scan driver 2144 that are illustrated in FIG. 7.

The display module 1140 may further include an emission driver. The emission driver may output an emission control signal to the display panel 1141 in response to a control signal received from the controller 1112-1. The emission driver may be formed separately from the gate driver 1142, or may be integrated into the gate driver 1142.

The source driver 1143 may receive a control signal from the controller 1112-1, convert image data to an analog voltage (e.g., a data signal) in response to the control signal, and output data signals to the display panel 1141. The source driver 1143 may include the data driver 2122 illustrated in FIG. 7.

The source driver 1143 may be integrated into another component (e.g., the controller 1112-1). The functions of the interface conversion circuit and the timing control circuit of the controller 1112-1 may be integrated into the source driver 1143. In addition, the display module 1140 may further include the reset circuit 2141 and the readout circuit 2142.

The display module 1140 may further include a voltage generation circuit 1144. The voltage generation circuit 1144 may output various voltages needed to drive the display panel 1141. For example, the voltage generation circuit 1144 may generate various power voltages VDD, VSS, VRST, and VCOM shown in FIG. 7 and supply the power voltages VDD, VSS, VRST, and VCOM to the pixel component 112.

In an embodiment, the display panel 1141 may include the plurality of pixels PX and the plurality of photo sensors PHS that are shown in FIG. 1.

In an embodiment, the source driver 1143 may convert data that is included in image data received from the processor 1110 and corresponds to red (R), green (G), and blue (B) to a red data signal (or a data voltage), a green data signal, and a blue data signal, and provide the data signals to a plurality of pixel columns included in the display panel 1141 during a single horizontal period.

The power module 1150 may supply power to the components of the electronic device 1000. The power module 1150 may include a battery to store power voltage. The battery may include a primary cell, which cannot be recharged, and a secondary cell or a fuel cell, which are rechargeable. The power module 1150 may include a power management integrated circuit (PMIC). The PMIC may supply optimized power to each of the foregoing modules and modules to be described below. The power module 1150 may include a wireless power transceiver that is electrically connected with the battery. The wireless power transceiver may include a plurality of coiled antenna radiators.

The electronic device 1000 may further include the embedded module 1160 and the external mounted module 1170. The embedded module 1160 may include the sensor module 1161, the antenna module 1162, and the sound output module 1163. The external mounted module 1170 may include the camera module 1171, a light module 1172, and the communication module 1173.

The sensor module 1161 may sense input from the body of the user or input from a pen of the first input module 1131, and generate an electric signal or a data value corresponding to the input. The sensor module 1161 may include at least one or more among the fingerprint sensor 1161-1, the input sensor 1161-2, and a digitizer 1161-3.

The fingerprint sensor 1161-1 may generate a data value corresponding to the fingerprint of the user. The fingerprint sensor 1116-1 may include the photo sensors PHS shown in FIG. 1.

The input sensor 1161-2 may generate a data value corresponding to coordinate information of input from the body of the user or input from the pen. The input sensor 1161-2 may generate a data value corresponding to the amount of change in capacitance by the input. The input sensor 1161-2 may sense input from a passive pen, or transmit or receive data to or from an active pen. The input sensor 1161-2 may include the sensors SC shown in FIG. 1.

The input sensor 1161-2 may measure a biometric signal pertaining to biometric information such as a blood pressure, body fluid, or body fat. For example, in the case where the user brings a part of his/her body into contact with the sensor layer or the sensing panel and remains stationary for a certain time, the input sensor 1161-2 may sense a biometric signal, based on a change in electric field by the part of his/her body, and output information desired by the user to the display module 1140.

The digitizer 1161-3 may generate a data value corresponding to coordinate information of an input from a pen. The digitizer 1161-3 may generate data values corresponding to electromagnetic variations caused by the input. The digitizer 1161-3 may sense an input from a passive pen, or transmit or receive data to or from an active pen.

At least one of the fingerprint sensor 1161-1, the input sensor 1161-2, and the digitizer 1161-3 may be implemented as a sensor layer formed on the display panel 1141 through a successive process. At least one among the fingerprint sensor 1161-1, the input sensor 1161-2, and the digitizer 1161-3 may be disposed over the display panel 1141. Any one among the fingerprint sensor 1161-1, the input sensor 1161-2, and the digitizer 1161-3, for example, the digitizer 1161-3, may be disposed under the display panel 1141.

At least two or more among the fingerprint sensor 1161-1, the input sensor 1161-2, and the digitizer 1161-3 may be formed to be integrated into a single sensing panel through the same process. In the case where at least two or more among the fingerprint sensor 161-1, the input sensor 161-2, and the digitizer 161-3 are integrated into a single sensing panel, the sensing panel may be disposed between the display panel 1141 and a window disposed over the display panel 1141. In an embodiment, the sensing panel may be disposed on the window, and the position of the sensing panel is not particularly limited.

At least one of the fingerprint sensor 1161-1, the input sensor 1161-2, and the digitizer 1161-3 may be embedded in the display panel 1141. In other words, during a process of forming components (e.g., a light emitting element, a transistor, and the like) included in the display panel 1141, at least one among the fingerprint sensor 1161-1, the input sensor 1161-2, and the digitizer 1161-3 may be formed simultaneously with the components.

In addition, the sensor module 1161 may generate an electrical signal or data value corresponding to internal conditions or external conditions of the electronic device 1000. The sensor module 1161 may further include, for example, a gesture sensor, a gyroscope sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas to transmit or receive a signal or power to or from an external device. In an embodiment, the communication module 1173 may transmit a signal to an external electronic device or receive a signal from the external electronic device through an antenna suitable for a communication scheme. An antenna pattern of the antenna module 1162 may be integrated to a component of the display module 1140 (e.g., the display panel 1141 of the display module 1140) or the input sensor 1161-2.

The sound output module 1163 may be a device for outputting a sound signal to a device provided outside the electronic device 1000, and, for example, may include a speaker, which is used for typical purposes such as reproducing multimedia or record data, and a receiver, which is used only for phone reception. In an embodiment, the receiver may be integrally or separately formed with a speaker. A sound output pattern of the sound output module 1163 may be integrated into the display module 1140.

The camera module 1171 may capture a static image or a video. In an embodiment, the camera module 1171 may include one or more lenses, an image sensor, or an image signal processor. The camera module 1171 may further include an infrared camera capable of sensing the presence of the user, the position of the user, a line of sight of the user, etc.

The light module 1172 may provide light. The light module 1172 may include a light emitting diode or a xenon lamp. The light module 1172 may be operated interlocking with the camera module 1171 or operated independently therefrom.

The communication module 1173 may form a wire or wireless communication channel between the electronic device 1000 and the external electronic device 2000, and support execution of communication through the formed communication channel. The communication module 1173 may include either or both a wireless communication module such as a cellular communication module, a short-range wireless communication module, or a global navigation satellite system (GNSS) communication module, and a wire communication module such as a local area network (LAN) communication module, or a power line communication module. The communication module 1173 may communicate with the external electronic device 2000 through a short-range communication network such as Bluetooth, WiFi Direct or infrared data association (IrDA), or a long-range communication network such as a cellular network, an internet, or a computer network (e.g., LAN or WAN). The various types of communication modules 1173 described above may be implemented as a single chip or may be implemented as respective separate chips.

The input module 1130, the sensor module 1161, the camera module 1171, and the like, interlocking with the processor 1110, may be used to control the operation of the display module 1140

The processor 1110 may output a command or data to the display module 1140, the sound output module 1163, the camera module 1171, or the light module 1172, based on input data received from the input module 1130. For example, the processor 1110 may generate image data in response to input data applied through a mouse, an active pen, or the like and output the image data to the display module 1140, or may generate command data in response to input data and output the command data to the camera module 1171 or the light module 1172. In the case where input data is not received from the input module 1130, the processor 1110 may convert the operation mode of the electronic device 1000 to a low-power mode or a sleep mode, thus reducing the power consumption of the electronic device 1000.

The processor 1110 may output a command or data to the display module 1140, the sound output module 1163, the camera module 1171, or the light module 1172, based on sensing data received from the sensor module 1161. For example, the processor 1110 may compare authentication data applied from the fingerprint sensor 1161-1 with the authentication data stored in the memory 1120, and may execute an application depending on a result of the comparison. The processor 1110 may execute a command based on sensing data sensed by the input sensor 1161-2 or the digitizer 1161-3, or output corresponding image data to the display module 1140. In the case where the sensor module 1161 includes a temperature sensor, the processor 1110 may receive temperature data for a measured temperature from the sensor module 1161, and further execute a luminance correction operation for the image data based on the temperature data.

The processor 1110 may receive measurement data for the presence of the user, the position of the user, a line of sight of the user, or the like from the camera module 1171. The processor 1110 may further execute a luminance correction operation for the image data based on the measurement data. For example, the processor 1110 that has determined whether the user is present through an input from the camera module 1171 may output, to the display module 1140, image data the luminance of which is corrected by the data conversion circuit 1112-2 or the gamma correction circuit 1112-3.

Some components among the foregoing components may be connected to each other by a communication scheme, e.g., a bus, general purpose input/output (GPIO), a serial peripheral interface (SPI), a mobile industry processor interface (MIPI), or a ultra path interconnect (UPI) link, which can be used between peripheral devices, and may thus exchange a signal (e.g., a command or data) therebetween. The processor 1110 may communicate with the display module 1140 through a predefined interface. For example, any one of the foregoing communication schemes may be used, and the interface is not limited to the foregoing communication schemes.

In a display device, a method of driving the display device, and an electronic device including the display device in accordance with embodiments of the present disclosure, touch sensors and photo sensors may be used to sense input from an object, thus making it possible to determine a real touch regardless of ghost touches.

However, effects of the present disclosure are not limited to the above-described effects, and various modifications are possible without departing from the spirit and scope of the present disclosure.

While embodiments of the present disclosure have been described above, those skilled in the art will appreciate that various modifications, additions and substitutions are possible, without departing from the scope and spirit of the present disclosure claimed in the appended claims.

What is claimed is:
1. A display device, comprising:
a display component comprising pixels and photo sensors;
a sensor component provided to at least partially overlap the display component, and including sensors;
a first sensor driver configured to drive the sensor component, sense a touch of an object, and generate detection data;
a second sensor driver configured to drive the photo sensors, sense the touch of the object during a first sensing section, sense a fingerprint of a user during a second sensing section, and generate sensing data; and a processor configured to determine whether the touch of the object is present using the detection data and the sensing data.

2. The display device according to claim 1, wherein the processor determines that the object has been touched for real in a case where both the first sensor driver and the second sensor driver determine that the touch of the object is present.

3. The display device according to claim 1, wherein the processor determines the object as having not been touched in a case where either the first sensor driver or the second sensor driver determines that the touch of the object is not present.

4. The display device according to claim 1, wherein the processor primarily determines the touch of the object using the detection data, and secondarily determines the touch of the object using the sensing data.

5. The display device according to claim 1,
wherein the second sensor driver supplies the sensing data to the first sensor driver in a case where the object is touched in a specific area of the display component, and
wherein the first sensor driver suspends baseline tracking in a case where the sensing data is inputted.

6. The display device according to claim 5, wherein the first sensor driver detects whether the touch of the object is present in the specific area after suspending the baseline tracking.

7. The display device according to claim 5, wherein the specific area is a proximity touch area.

8. The display device according to claim 1, wherein the first sensor driver and the second sensor driver are connected by a communication line.

9. The display device according to claim 1, wherein the first sensing section and the second sensing section are included in one frame period.

10. The display device according to claim 1, wherein the first sensing section is included in a first frame period, and the second sensing section is included in a second frame period adjacent to the first frame period.

11. A method of driving a display device, comprising:
sensing a touch of an object using touch sensors;
sensing a fingerprint and the touch of the object by driving photo sensors in a time-sharing manner; and
determining the touch of the object as a real touch in a case where the touch of the object is sensed in both the touch sensors and the photo-sensors.

12. The method according to claim 11, wherein the fingerprint is sensed by the photo sensors at least one time during one frame period, and the touch of the object is sensed by the photo sensors at least one time during the one frame period.

13. The method according to claim 11, wherein in a case where the touch of the object is not sensed by either the touch sensors or the photo sensors, the object is determined as having not been touched.

14. The method according to claim 11, further comprising, in a case where the touch of the object is sensed by the photo sensors, suspending baseline tracking, and then sensing the touch of the object using the touch sensors.

15. The method according to claim 11, wherein a first sensor driver configured to drive the touch sensors and a second sensor driver configured to drive the photo sensors communicate with each other through a communication line.

16. The method according to claim 11, wherein the photo sensors sense the fingerprint during a first frame period, and sense the touch of the object during a second frame period adjacent to the first frame period.

17. An electronic device comprising:
a display panel comprising a display component including pixels and photo sensors, and a sensor component configured to at least partially overlap the display component and including sensors;
a first sensor driver configured to drive the sensor component, sense a touch of an object, and generate detection data;
a second sensor driver configured to drive the photo sensors, sense the touch of the object during a first sensing section, sense a fingerprint of a user during a second sensing section, and generate sensing data; and
an application processor configured to determine whether the touch of the object is present using the detection data and the sensing data.

18. The electronic device according to claim 17, wherein the application processor determines that the object has been touched for real in a case where an input from the object is sensed by both the first sensor driver and the second sensor driver.

19. The electronic device according to claim 18,
wherein the second sensor driver supplies the sensing data to the first sensor driver in a case where the object is touched in a specific area of the display component, and
wherein, in a case where the sensing data is inputted, the first sensor driver suspends the baseline tracking and then detects whether the touch of the object is present in the specific area.

20. The electronic device according to claim 18, wherein the first sensor driver and the second sensor driver are connected by a communication line.

* * * * *